(12) United States Patent
Furuta

(10) Patent No.: US 8,880,049 B2
(45) Date of Patent: Nov. 4, 2014

(54) WIRELESS COMMUNICATION APPARATUS AND WIRELESS COMMUNICATION METHOD

(75) Inventor: Daitaro Furuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 292 days.

(21) Appl. No.: 12/801,976

(22) Filed: Jul. 6, 2010

(65) Prior Publication Data

US 2011/0019774 A1 Jan. 27, 2011

(30) Foreign Application Priority Data

Jul. 22, 2009 (JP) ................. 2009-171383

(51) Int. Cl.
*H04M 3/00* (2006.01)
*H04L 29/08* (2006.01)
*G06F 9/445* (2006.01)
*G05B 19/42* (2006.01)

(52) U.S. Cl.
CPC *H04L 67/34* (2013.01); *G06F 8/65* (2013.01); *H04L 67/04* (2013.01)
USPC ........................................... 455/418; 700/86

(58) Field of Classification Search
USPC .................................. 455/418, 419
See application file for complete search history.

(56) References Cited

U.S. PATENT DOCUMENTS

| | | | |
|---|---|---|---|
| 2004/0098715 | A1 | 5/2004 | Aghera et al. |
| 2004/0264433 | A1 | 12/2004 | Melpignano |
| 2005/0186952 | A1* | 8/2005 | Kitajima ................. 455/419 |
| 2007/0190994 | A1 | 8/2007 | Sakai et al. |
| 2008/0104585 | A1 | 5/2008 | Kamijima |
| 2009/0278738 | A1* | 11/2009 | Gopinath ................. 342/357.12 |

FOREIGN PATENT DOCUMENTS

| | | |
|---|---|---|
| EP | 1 672 938 | 6/2006 |
| JP | 2005-509381 | 4/2005 |
| JP | 2007-221449 | 8/2007 |
| WO | 03/041424 | 5/2003 |
| WO | 2009/078660 | 6/2009 |

OTHER PUBLICATIONS

Extended European Search Report for corresponding European Application 10168580.8-2413; dated Nov. 9, 2010.
Japan Office Action mailed Dec. 4, 2012 in corresponding Japanese Patent Application No. 2009-171383 (2 pages) (3 pages English translation).

* cited by examiner

*Primary Examiner* — Michael Faragalla
*Assistant Examiner* — Chayce Bibbee
(74) *Attorney, Agent, or Firm* — Staas & Halsey LLP

(57) ABSTRACT

A wireless communication apparatus includes a wireless processing unit for performing communication by wireless and an application processing unit for executing an application. The wireless processing unit of the wireless communication apparatus detects reception of wireless function update information for updating a function of the wireless processing unit when update information for updating any function of the wireless communication apparatus is received. After that, the wireless processing unit updates the function of the wireless processing unit, if reception of wireless function update information is detected, by performing an update process specified in the wireless function update information without involving the application processing unit.

9 Claims, 11 Drawing Sheets

WIRELESS COMMUNICATION APPARATUS AND WIRELESS COMMUNICATION METHOD

CROSS-REFERENCE TO RELATED APPLICATIONS

This application is based upon and claims the benefit of priority of the prior Japanese Patent Application No. 2009-171383, filed on Jul. 22, 2009, the entire contents of which are incorporated herein by reference.

FIELD

The embodiments discussed herein are directed to a wireless communication apparatus and a wireless communication method.

BACKGROUND

Conventionally, there is used a wireless communication apparatus that performs a plurality of processes using wireless communication, such as a mobile terminal device that performs a plurality of processes, such as an application process in addition to a voice communication process and a data communication process. Such a wireless communication apparatus is equipped with two types of processors (CPUs (Central Processing Units)): a CPU for wireless processing (hereinafter, referred to as a "CCPU") and a CPU for an application (hereinafter, referred to as an "ACPU"). By using a plurality of CPUs designed for the purposes in this way, it is possible to achieve high-speed processing.

A configuration of the wireless communication apparatus described above is explained with reference to FIG. 10. As illustrated in FIG. 10, a wireless communication apparatus 10 includes an antenna 11, a wireless function unit 15, and an application function unit 40.

The antenna 11 transmits and receives data exchanged with another wireless communication apparatus or the like via a base station. For example, the antenna 11 transmits and receives packet data, such as voice data or an image, exchanged with another wireless communication apparatus. Furthermore, the antenna 11 receives application information, update information of software or firmware, and the like that are transmitted from a management server and the like, and outputs the received information to a digital processing unit 16 to be described below. The update information is, for example, information on a version upgrade.

The wireless function unit 15 includes a wireless processing unit 20, the digital processing unit 16, an SDRAM (Synchronous Dynamic Random Access Memory) memory 17, and a nonvolatile memory 18 such as a ROM (Read Only Memory).

The digital processing unit 16 is a processing unit including a DSP (Digital Signal Processor), and includes a layer-1 data transfer program 16a and a layer-1 wireless control program 16b. The layer-1 data transfer program 16a outputs data received via the antenna 11, such as update information, to a layer-1-side interface 24b. Furthermore, the layer-1 data transfer program 16a transmits data processed by the wireless processing unit 20 to a destination by wireless communication via the antenna 11.

The layer-1 wireless control program 16b outputs wireless data received via the antenna 11, such as voice data, to a resource control function unit 23. Furthermore, the layer-1 wireless control program 16b transmits voice data processed by the wireless processing unit 20 or application data processed by the application function unit 40 to a destination by wireless communication via the antenna 11.

The SDRAM memory 17 stores therein, for example, a programs or data used by the wireless processing unit 20 and the like. The nonvolatile memory 18 stores therein, for example, programs or data used by the wireless processing unit 20, the digital processing unit 16, and the like.

The wireless processing unit 20 is a processing unit including a CCPU, and includes a terminal adaptation function unit 21, an external interface 22, the resource control function unit 23, and a layer-2 function unit 24. Furthermore, the wireless processing unit 20 includes a real-time OS (Operating System) 25 and a boot function unit 26.

The terminal adaptation function unit 21 is a processing unit including a TAF (Terminal Adaptation Function), and is connected to the resource control function unit 23 and the like via a general-purpose bus, and performs protocol conversion and the like. Furthermore, the terminal adaptation function unit 21 makes adaptation of communication between the wireless communication apparatus 10 and the base station or another wireless communication apparatus. Moreover, the terminal adaptation function unit 21 is connected to the application function unit 40 via the external interface 22, and receives application information, update information of software or firmware, or the like that is received by the antenna 11.

The resource control function unit 23 is a processing unit including an RRC (Radio Resource Control). Furthermore, the resource control function unit 23 is connected to the layer-1 wireless control program 16b that performs the wireless control, and controls a wireless link control protocol for controlling a wireless link between another terminal device and a wireless access network (a layer 3 protocol). For example, the resource control function unit 23 executes respective procedures for the management of wireless resources and the wireless link control.

The layer-2 function unit 24 includes a plurality of layer-2 programs 24a, and performs various processes on data transmitted or received by a layer 2 protocol, such as the data link layer. Furthermore, the layer-2 function unit 24 is connected to the digital processing unit 16 via the layer-1-side interface 24b, and is connected to the other control units of the wireless processing unit 20 via a layer-2-side interface 24c. The plurality of layer-2 programs 24a of the layer-2 function unit 24 stores data received from the digital processing unit 16 via the layer-1-side interface 24b in an IP packet buffer 24d. The layer-2 programs 24a include, for example, a PDCP (Packet Data Control Protocol), an RLC (Radio Link Control), and a MAC (Medium Access Control). The PDCP is, for example, a protocol processing unit that performs the data control. The RLC is, for example, a processing unit that controls the radio link. The MAC is, for example, a processing unit that controls the medium access.

The real-time OS 25 has a function of estimating the processing time required for a process, a mechanism for completing a process within a desired time even in a case where a plurality of processing requests come up at the same time, and the like, and performs a task. Furthermore, the real-time OS 25 holds task scheduling, and performs the highest-priority task based on priorities of tasks.

The boot function unit 26 includes a ROM for storing a boot program to boot up the wireless communication apparatus 10, and boots, shuts down, or reboots the wireless communication apparatus 10 in accordance with the user's instruction operation or when receiving data including a command, such as a boot command, a shutdown command, or a reboot command.

The application function unit 40 is a processing unit including an ACPU, and includes, in the same manner as the wireless function unit 15, an SDRAM memory, a nonvolatile memory, and the like, and stores therein an application, and executes the application in accordance with the user's instruction operation or the like.

As described above, the wireless communication apparatus that performs a plurality of processes, such as wireless communication and an application process, has a complex configuration. Recently, with the spread of the LTE (Long Term Evolution), faster processing, execution of a more complex application, high-precision image processing, and the like are requested in the wireless communication apparatus. To comply with these requests, it is necessary to perform a version upgrade of software or firmware, which is the function units described above, or the like.

A flow of a process of updating the wireless communication apparatus 10 using wireless communication is explained with reference to FIG. 11. FIG. 11 is a sequence diagram illustrating a flow of a conventional update process. The update of the wireless communication apparatus 10 here means, for example, wireless update or over-the-air download of firmware or software. As an example of update information processing, a case of using over-the-air download is explained here; however, even in a case of using wireless update or the like, the same problems exist.

The wireless communication apparatus 10 and the base station (eNodeB) are connected by wireless communication. Furthermore, the base station and a management server are connected by wireless communication. The management server transmits update information to the wireless communication apparatus 10, and is managed by a manufacturer that supplies the wireless communication apparatuses to users or the like. Namely, the wireless communication apparatus 10 and the management server are connected by wireless communication via the base station.

As illustrated in FIG. 11, when the base station notifies the wireless communication apparatus 10 of initiation handshake by an over-the-air download application (Step S501), the wireless communication apparatus 10 detects an over-the-air download (Step S502). Here, for example, the wireless communication apparatus 10 displays information that the over-the-air download has been detected on a display or the like. The base station receives information that the firmware update is needed from the management server or the like, and notifies the wireless communication apparatus 10 of the information. When receiving the notification from the base station, the wireless communication apparatus 10 displays information that firmware update is needed on the display or the like.

Then, when receiving an instruction to start the over-the-air download update from a user (Step S503), the wireless communication apparatus 10 transmits an over-the-air download start instruction to the base station (Step S504). When receiving the start instruction, the base station transmits an over-the-air download PDU (Protocol Data Unit) received from the management server to the wireless communication apparatus 10 (Step S505). The layer-1 data transfer program 16*a* of the wireless communication apparatus 10 receives the transmitted over-the-air download PDU (Step S506). The PDU is data handled by a protocol, and denotes, for example, a packet, a frame, or a cell.

Subsequently, the digital processing unit 16 of the wireless communication apparatus 10 transmits the received PDU to the layer-2 function unit 24 (Step S507). The layer-2 function unit 24 stores the received PDU as an IP packet in the IP packet buffer 24*d* (Step S508). Then, the application function unit 40 reads out the IP packet from the IP packet buffer 24*d*, and starts the assembly of an update program (Step S509).

After that, the application function unit 40 reads out all the over-the-air download PDUs received from the base station from the IP packet buffer 24*d*, and completes the assembly of the update program (Steps S510 to S514). Then, the application function unit 40 instructs the terminal adaptation function unit 21 to deactivate the wireless processing function (Step S515). The terminal adaptation function unit 21 instructed to deactivate the wireless processing function instructs the resource control function unit 23 to deactivate the wireless processing function (Step S516).

Subsequently, the resource control function unit 23 transmits an instruction for deactivation of the wireless processing function to both of the layer-2 function unit 24 and the digital processing unit 16 (Steps S517 and S518). As a result, the wireless communication apparatus 10 deactivates the wireless processing function, and the communication with the outside is blocked (Step S519).

After the wireless processing function is deactivated in this manner, the application function unit 40 writes the assembled update program on the nonvolatile memory 18 (Step S520), and transmits an update instruction to the boot function unit 26 (Step S521). When receiving the update instruction, the boot function unit 26 performs code expansion (Step S522). Namely, the boot function unit 26 reads out the update program written on the nonvolatile memory 18, writes the read update program on the SDRAM memory 17, and writes the read update program on the SDRAM memory 17, and then starts performing an update process by executing the update program written on the SDRAM memory 17.

After that, when the boot function unit 26 receives an interrupt request from the terminal adaptation function unit 21 that has completed the code expansion, the process flow branches to the beginning of a main program of the real-time OS 25 (Step S523). The boot function unit 26 that has generated the interrupt, for example, reboots the wireless communication apparatus 10, and transmits information of completion of the update to the application function unit 40 (Step S524).

When receiving the information of completion of the update, the application function unit 40 transmits a request for the activation of the wireless processing function to the terminal adaptation function unit 21 (Step S525). After that, as a wireless processing function activation task, which is the highest-priority task, the functions, such as the wireless processing function of the terminal adaptation function unit 21, are activated by the real-time OS 25, and the wireless communication apparatus 10 initiates the wireless communication (Step S526).

Patent document 1: Japanese National Publication of International Patent Application No. 2005-509381

However, in the conventional technology described above, there is a problem that it takes time to perform any of update processes for updating the wireless function, an application, and the like. Specifically, for example, when firmware or software of layers 1 to 3 of the wireless function is updated using wireless communication, such as over-the-air download, it is necessary to always use a higher-level protocol of the application function unit 40.

The above problem is specifically explained with reference to FIG. 12. As illustrated in FIG. 12, the management server, which provides update information, has a communication processing function capable of controlling the physical layer (PHY) defining a protocol of layer 1 and the data link layer defining a protocol of layer 2, such as the Ethernet (registered trademark). Furthermore, the management server has a communication processing function capable of controlling the network layer defining a protocol such as the Internet Protocol version 4 (IPv4) or the Internet Protocol version 6 (IPv6). Moreover, the management server has a communication processing function capable of controlling the transport layer defining a protocol such as the UDP (User Datagram Protocol)/TCP (Transmission Control Protocol). The management server holds an over-the-air download delivery application for delivering update information in the application layer higher than the transport layer. Namely, the management server delivers an over-the-air download indicating update information using the protocol of the application layer higher than the UDP/TCP.

On the other hand, the base station has, as illustrated in FIG. 12, a communication processing function capable of controlling the physical layer (PHY) defining a protocol of layer 1 and the data link layer defining a protocol of layer 2 in which the PDCP, the RLC, the MAC, and the like perform processing. Furthermore, the base station has a communication processing function capable of controlling the network layer in which the IP routing for transmitting and receiving a TCP/IP packet is implemented. The base station does not have a function capable of processing a higher-level layer higher than the transport layer, such as the UDP/TCP.

And, the wireless communication apparatus 10 has, as illustrated in FIG. 12, the layer-2 function unit 24 capable of controlling respective protocols defined in the physical layer (PHY), the data link layer, and the network layer. Specifically, the layer-2 function unit 24 has a communication processing function capable of controlling the physical layer (PHY), such as a bus interface. Furthermore, the layer-2 function unit 24 has a communication processing function capable of controlling the data link layer, such as a shared memory interface, the PDCP, the RLC, and the MAC. Moreover, the layer-2 function unit 24 has a communication processing function capable of controlling the transport layer in which RoHC can be implemented.

Furthermore, the wireless communication apparatus 10 has the terminal adaptation function unit 21 and the resource control function unit 23 that are capable of controlling respective protocols defined in the physical layer (PHY), the data link layer, and the network layer. Specifically, the terminal adaptation function unit 21 and the resource control function unit 23 have a communication processing function capable of controlling USB (Universal Serial Bus) communication and the like. Furthermore, the terminal adaptation function unit 21 and the resource control function unit 23 have a communication processing function capable of controlling a PPP (Point-to-Point Protocol) server function, a shared memory interface, and the like. Moreover, the terminal adaptation function unit 21 and the resource control function unit 23 have a communication processing function capable of controlling the IP routing for transmitting and receiving a TCP/IP packet.

Moreover, the wireless communication apparatus 10 has the application function unit 40 capable of controlling respective protocols defined in the physical layer (PHY), the data link layer, the network layer, the transport layer, and the application layer. Specifically, the application function unit 40 has a communication processing function capable of controlling the physical layer (PHY) such as USB communication, the data link layer such as a PPP client function, the network layer such as the IPv4 or the IPv6, the transport layer such as the UDP/TCP, and the like. Furthermore, the application function unit 40 holds an over-the-air download processing application for receiving update information and executing the update in the application layer higher than the transport layer. Namely, the application function unit 40 receives an over-the-air download indicating update information and executes the update on the application layer higher than the UDP/TCP.

In this manner, the layer-2 function unit 24 including a CCPU, the terminal adaptation function unit 21, and the resource control function unit 23 in the wireless communication apparatus 10 do not have a function capable of processing a higher-level layer higher than the transport layer, such as the UDP/TCP. Namely, in the wireless communication apparatus 10, only the application function unit 40 has the over-the-air download processing application capable of processing update information provided from the management server.

Consequently, in the wireless communication apparatus 10, after the wireless function unit 15 once receives update information transmitted from the management server, the update information is transmitted to the application function unit 40. After that, the wireless communication apparatus 10 executes an update program or the like that is generated from the update information by the application function unit 40. Namely, even when receiving update information from an external device or the like, the wireless communication apparatus 10 needs to perform internal data transfer, so it takes a lot of time to perform a series of processes from reception of the update information to completion of the update.

Furthermore, even in a case of the update using a data card in which update information, such as an update program, is stored, although a process of reading out the update program from the data card is performed by the wireless function unit 15, the wireless function unit 15 is not able to analyze and execute the update program. Thus, the wireless function unit 15 needs to transmit the update program read out from the data card to the application function unit 40 to cause the application function unit 40 to execute the update program.

SUMMARY

According to an aspect of an embodiment of the invention, a wireless communication apparatus includes a wireless processing unit that performs wireless communication; and an application processing unit that executes an application. The wireless processing unit includes an update detecting unit that detects reception of wireless function update information for updating a function of the wireless processing unit when update information for updating any function of the wireless communication apparatus is received; and an update processing unit that updates the function of the wireless processing unit, if the reception of wireless function update information is detected by the update detecting unit, by performing an update process specified in the wireless function update information without involving the application processing unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. The present invention is not limited to the embodiments.

Figure 1:
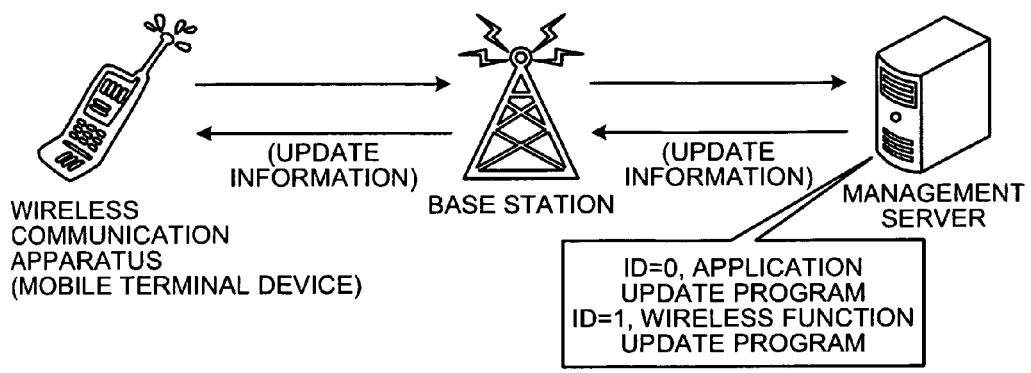
FIG. 1 is a diagram illustrating a configuration of an entire system including a wireless communication apparatus.

First, a configuration of an entire system including the wireless communication apparatus is explained with reference to FIG. 1. FIG. 1 is a diagram illustrating the configuration of the entire system including the wireless communication apparatus. As illustrated in FIG. 1, the disclosed, wireless communication apparatus is connected to a base station by wireless communication, and is connected to a management server by wireless communication via the base station. The management server is a server managed by a manufacturer that supplies wireless communication apparatuses to users or the like, and delivers update information to the wireless communication apparatuses manufactured by the manufacturer through over-the-air download or the like. The update information is, for example, an update program or update data on a version upgrade. Furthermore, the update information includes an application update program for updating a function of a processor for an application (hereinafter, referred to as an "ACPU") and a wireless function update program for updating a function of a processor for wireless processing (hereinafter, referred to as a "CCPU").

The management server delivers the application update program or the wireless function update program to the wireless communication apparatus with distinguishing between these update programs. For example, the management server distinguishes update information to be delivered by delivering a packet of the application update program with "ID=0" attached to the packet header and a packet of the wireless function update program with"ID=1" attached to the packet header. Furthermore, the management server delivers various update information using a predetermined port number assigned to the wireless communication apparatus.

The disclosed wireless communication apparatus is a mobile terminal device that performs a plurality of processes, such as an application process in addition to a voice communication process and a data communication process, using wireless communication, and for example, is a high-precision mobile terminal device equipped with the LTE (Long Term Evolution). However, the disclosed wireless communication apparatus is not limited to a mobile terminal device. For example, the wireless communication apparatus can be a known information processing terminal, such as a personal computer, a workstation, a mobile phone, a PHS (Personal Handy-phone System) terminal, a mobile communication terminal, or a PDA (Personal Digital Assistant).

[a] First Embodiment

Figure 2:
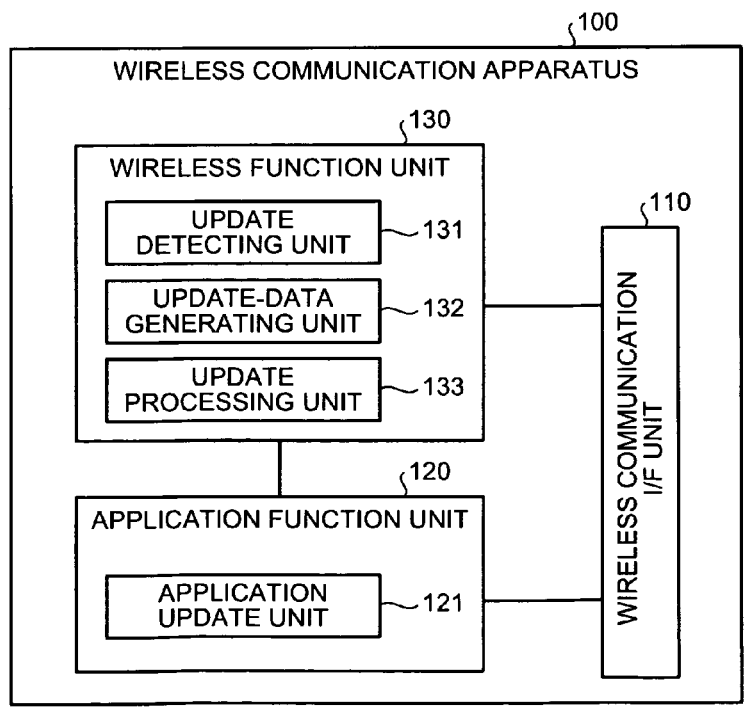
FIG. 2 is a block diagram illustrating a configuration of a wireless communication apparatus according to a first embodiment.

Subsequently, a configuration of the disclosed wireless communication apparatus is explained with reference to FIG. 2. FIG. 2 is a block diagram illustrating a configuration of a wireless communication apparatus according to a first embodiment.

As illustrated in FIG. 2, a wireless communication apparatus 100 includes a wireless communication I/F unit 110, an application function unit 120, and a wireless function unit 130. The wireless communication I/F unit 110 is an interface for establishing wireless communication with the base station, the management server, or another wireless communication apparatus, and for example, establishes data communication or voice communication with another wireless communication apparatus via the base station. Furthermore, the wireless communication I/F unit 110 receives update information, such as an application update program or a wireless function update program, from the management server via the base station.

The application function unit 120 is a processing unit including an ACPU, and executes an application stored in the wireless communication apparatus 100 or an application acquired from the outside, and includes an application update unit 121 that updates the application. For example, the application function unit 120 holds applications in a memory (not illustrated) or the like, and in accordance with the user's instruction operation, reads out a corresponding application from the memory, executes the application, and performs a display output to a display unit, such as a display, or a voice output to a speaker.

The application update unit 121 updates the application held in the application function unit 120, the function of the ACPU, and the like. For example, the application update unit 121 acquires only packets with "ID=0" attached to the IP (Internet Protocol) header thereof out of packets of update information received by the wireless communication I/F unit 110. Then, the application update unit 121 assembles the packets attached with "ID=0" thereby generating an application update program or application update data. Then, the application update unit 121 updates the application held in the application update unit 121, the function of the ACPU, or the like, for example, by writing the generated application update data on a memory (not illustrated) or the like. Furthermore, the application update unit 121 executes the generated application update program, and for example, rewrites the registry or the program held in the memory thereby updating the application, the function of the ACPU, or the like.

The wireless function unit 130 is a processing unit including a CCPU, and controls the wireless communication, such as data communication or voice communication, and specifically includes an update detecting unit 131, an update-data generating unit 132, and an update processing unit 133. For example, the wireless function unit 130 makes wireless communication, such as voice communication or sending and reception of an e-mail, with another wireless communication apparatus.

The update detecting unit 131 detects a wireless function update program for updating the wireless function unit 130. Specifically, the update detecting unit 131 acquires a packet for updating the wireless function unit 130 out of packets of update information received by the wireless communication I/F unit 110, and outputs the acquired packet to the update-data generating unit 132. For example, the update detecting unit 131 acquires only a packet with "ID=1" attached to the IP header thereof out of packets of update information received by the wireless communication I/F unit 110, and outputs the acquired packet to the update-data generating unit 132.

The update-data generating unit 132 receives the wireless function update program detected by the update detecting unit 131, and generates a wireless function update program or wireless function update data. Specifically, the update-data generating unit 132 generates a wireless function update program or wireless function update data by assembling packets of update information with "ID=1" attached to the IP header thereof, and outputs the generated wireless function update program or wireless function update data to the update processing unit 133.

The update processing unit 133 updates the function of the wireless function unit 130 or the CCPU, etc. using the wireless function update program or wireless function update data generated by the update-data generating unit 132. Specifically, the update processing unit 133 receives the wireless function update data from the update-data generating unit 132, and updates the function of the wireless function unit 130 or the CCPU, etc. for example, by writing the received wireless function update data on a memory (not illustrated) or the like. Furthermore, if the data received from the update-data generating unit 132 is a wireless function update program, the update processing unit 133 executes the wireless function update program, and for example, rewrites the registry or the program held in the memory thereby updating the function of the wireless function unit 130 or the CCPU, etc. The functions to be updated includes, for example, a module or protocol for making voice communication or data communication by wireless, a new function for the wireless communication apparatus 100 (a new function generated by the manufacturer), and the like.

In this manner, according to the first embodiment, update information for updating the application function unit 120 can be processed by the application function unit 120, and update information for updating the wireless function unit 130 can be processed by the wireless function unit 130. As a result, there is no need to transmit update information delivered from the management server to the application function unit 120, so it is possible to reduce the time taken to update the wireless function.

[b] Second Embodiment

The disclosed wireless communication apparatus can have various function units other than those described in the first embodiment. In a second embodiment, the wireless communication apparatus having various function units is explained.

Configuration of Wireless Communication Apparatus

Figure 3:
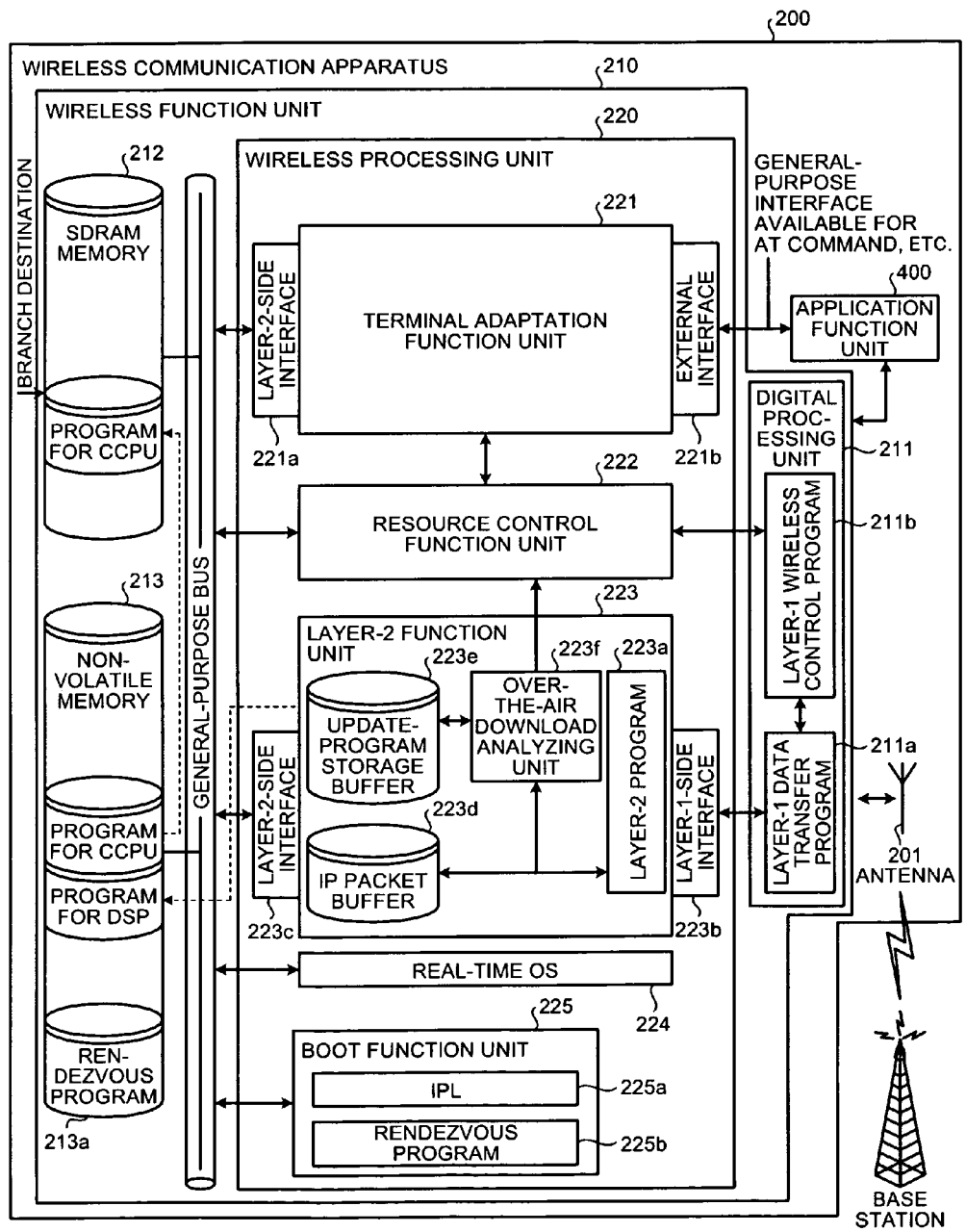
FIG. 3 is a block diagram illustrating a configuration of a wireless communication apparatus according to a second embodiment.

First, a configuration of a wireless communication apparatus according to the second embodiment is explained with reference to FIG. 3. FIG. 3 is a block diagram illustrating the configuration of the wireless communication apparatus according to the second embodiment.

As illustrated in FIG. 3, a wireless communication apparatus 200 includes an antenna 201, a wireless function unit 210, and an application function unit 400. The wireless function unit 210 and the application function unit 400 are each, for example, an integrated circuit, such as an ASIC (Application Specific Integrated Circuit) or an FPGA (Field Programmable Gate Array). Or, the wireless function unit 210 and the application function unit 400 are each, for example, an electronic circuit including a CPU (Central Processing Unit), an MPU (Micro Processing Unit), or the like.

The antenna 201 transmits and receives data exchanged with another wireless communication apparatus or the like via the base station. For example, the antenna 201 transmits and receives packet data, such as voice data or an image, exchanged with another wireless communication apparatus. Furthermore, the antenna 201 receives application information, update information of software or firmware, and the like that are transmitted from the management server and the like, and outputs the received information to a digital processing unit 211 to be described below. The update information is, for example, information on a version upgrade.

The wireless function unit 210 includes the digital processing unit 211, a wireless processing unit 220, an SDRAM (Synchronous Dynamic Random Access Memory) memory 212, and a nonvolatile memory 213 such as a read only memory.

The digital processing unit 211 is a processing unit including a DSP (Digital Signal Processor). For example, the digital processing unit 211 is connected to a resource control function unit 222 and a layer-2 function unit 223 to be described below, and controls transmission and reception of various data on voice communication or data communication and the like on layer 1 via the base station. The digital processing unit 211 includes a layer-1 data transfer program 211a and a layer-1 wireless control program 211b.

The layer-1 data transfer program 211a controls particularly data transmission and reception out of various communications exchanged via the base station. For example, the layer-1 data transfer program 211a receives a packet of update information transmitted from the management server via the base station, and transmits the received packet to the layer-2 function unit 223. Furthermore, the layer-1 data transfer program 211a transmits, for example, voice data output from the layer-1 wireless control program 211b to a destination terminal. Moreover, if the layer-1 data transfer program 211a receives an instruction for suspension of wireless processing from the layer-1 wireless control program 211b, the layer-1 data transfer program 211a suspends the wireless communication via the base station. Likewise, if the layer-1 data transfer program 211a receives an instruction for initiation of wireless processing, the layer-1 data transfer program 211a initiates wireless processing.

The layer-1 wireless control program 211b receives voice data, such as a voice packet, output from the resource control function unit 222, and outputs the received voice data to the layer-1 data transfer program 211a. Furthermore, the layer-1 wireless control program 211b outputs voice data, which is output from other devices and received by the layer-1 data transfer program 211a, to the resource control function unit 222. Then, if the layer-1 wireless control program 211b receives an instruction for suspension of wireless processing from the resource control function unit 222, the layer-1 wireless control program 211b outputs the received instruction for suspension of wireless processing to the layer-1 data transfer program 211a. Likewise, if the layer-1 wireless control program 211b receives an instruction for initiation of wireless processing, the layer-1 wireless control program 211b outputs the instruction for initiation of wireless processing.

The SDRAM memory 212 is connected to the wireless processing unit 220 via a general-purpose bus, and stores therein, for example, a program or data used by the wireless processing unit 220 and the like. Furthermore, the SDRAM memory 212 stores therein a branch destination, which is the beginning of the main program, referenced by a real-time OS (Operating System) 224 to be described below in an interrupt process.

The nonvolatile memory 213 is connected to the wireless processing unit 220 via the general-purpose bus, and stores therein, for example, a program or data used by the wireless processing unit 220, the digital processing unit 211, and the like. Furthermore, the nonvolatile memory 213 stores therein a rendezvous program 213a which is a program for executing an update process of the wireless function unit 210 using a wireless function update program or data generated by an over-the-air download analyzing unit 223f of the layer-2 function unit 223 to be described below. The rendezvous program 213a is written in an unoverwritten area of the nonvolatile memory 213 at the time of manufacturing the wireless communication apparatus 200 at the factory.

The wireless processing unit 220 is a processing unit including a CCPU, and controls the wireless communication, such as data communication or voice communication, on layer 2 or layer 3. The wireless processing unit 220 includes a terminal adaptation function unit 221, the resource control function unit 222, the layer-2 function unit 223, the real-time OS 224, and a boot function unit 225.

The terminal adaptation function unit 221 is a processing unit including a TAF (Terminal Adaptation Function), and includes a layer-2-side interface 221a and an external interface 221b. Specifically, the terminal adaptation function unit 221 makes adaptation of communication between the wireless communication apparatus 200 and the base station or another terminal device by performing protocol conversion or the like. Furthermore, the terminal adaptation function unit 221 is connected to the general-purpose bus via the layer-2-side interface 221a, thereby being connected to the other function units of the wireless processing unit 220, the SDRAM memory 212, and the nonvolatile memory 213. Moreover, the terminal adaptation function unit 221 is connected to the application function unit 400 by a general-purpose bus available for an AT command via the external interface 221b.

Then, the terminal adaptation function unit 221 makes the transition to an AT-command inputtable state in accordance with a control signal from the resource control function unit 222, the over-the-air download analyzing unit 223f of the layer-2 function unit 223, or the like, the user's instruction operation, or the like. Specifically, the terminal adaptation function unit 221 makes the transition to any of states: "On Line Data Mode", "On Line Command Mode", and "Off Line Command Mode" in accordance with a control signal, the user's instruction operation, or the like. The "On Line Data Mode" here is a state indicating during transmission or reception of data. The "On Line Command Mode" is a state in which the line is in use and an AT command can be input. The "Off Line Command Mode" is a state in which the line is not in use and an AT command can be input.

For example, if the terminal adaptation function unit 221 receives an "XOFF" signal indicating deactivation of the wireless processing function from the over-the-air download analyzing unit 223f of the layer-2 function unit 223, the terminal adaptation function unit 221 makes the transition to the state of "Off Line Command Mode". Then, the terminal adaptation function unit 221 outputs the "XOFF" signal to the application function unit 400. At this time, the terminal adaptation function unit 221 deactivates the wireless processing function, and stores information on the wireless connection just before the deactivation of the wireless processing function, information of the CCPU, connection information of the ACPU, and the like in the nonvolatile memory 213 and the like. As a result, a handover process can be performed. Namely, when the CCPU or the ACPU is again booted up, the CCPU or the ACPU can be reconnected to the connection destination before the deactivation.

Furthermore, for example, if the terminal adaptation function unit 221 receives an "XON" signal indicating initiation of the wireless processing function from the over-the-air download analyzing unit 223f of the layer-2 function unit 223, the terminal adaptation function unit 221 makes the transition to the state of "On Line Command Mode". Then, the terminal adaptation function unit 221 outputs the "XON" signal to the application function unit 400.

The resource control function unit 222 is a processing unit including an RRC (Radio Resource Control), and is connected to the layer-1 wireless control program 211b, and controls a wireless link control protocol for controlling a wireless link between another terminal device and a wireless access network. Specifically, the resource control function unit 222 executes respective procedures for the management of wireless resources and the wireless link control. For example, the resource control function unit 222 is equipped with the LTE, and makes the transition to an "LTE-IDLE" state in which the LTE is deactivated if the resource control function unit 222 receives an "XOFF" signal indicating deactivation of the wireless processing function from the over-the-air download analyzing unit 223f of the layer-2 function unit 223. The wireless communication apparatus 200 in the "LTE-IDLE" state is put into a state just after the power off.

Furthermore, if the resource control function unit 222 receives an "XON" signal indicating initiation of the wireless processing function from the over-the-air download analyzing unit 223f of the layer-2 function unit 223, the resource control function unit 222 makes the transition to an "LTE-ACTIVE" state in which the LTE is activated. The wireless communication apparatus 200 in the "LTE-ACTIVE" state is put into a state just after the power on.

The layer-2 function unit 223 includes a plurality of layer-2 programs 223a, and is connected to the digital processing unit 211 via a layer-1-side interface 223b, and is connected to the other control units of the wireless processing unit 220 via a layer-2-side interface 223c. Furthermore, the plurality of layer-2 programs 223a stores data received from the digital processing unit 211 via the layer-1-side interface 223b in an IP packet buffer 223d. The layer-2 programs 223a included in the layer-2 function unit 223 include a PDCP (Packet Data Control Protocol), an RLC (Radio Link Control), and a MAC (Medium Access Control). The PDCP is, for example, a protocol processing unit that performs the data control. The RLC is, for example, a processing unit that controls the radio link. The MAC is, for example, a processing unit that controls the medium access.

For example, the PDCP acquires only a PDU with "ID=1" attached to the IP header, i.e., a PDU for updating the wireless function unit 210 out of over-the-air download PDUs, which are update information received by the digital processing unit 211. Then, the PDCP assembles the acquired PDU into an IP packet, and stores the assembled IP packet in the IP packet buffer 223d to be described below. For example, a PDU with "ID=0" attached to the IP header is update information of the application function unit 400, so the application function unit 400 acquires the PDU attached with "ID=0". Furthermore, as for an area in which an ID is stored, for example, an IP header area used for RoHC (Robust Header Compression) can be used.

Furthermore, the layer-2 function unit 223 is connected to the general-purpose bus via the layer-2-side interface 223c, thereby being connected to the other function units of the wireless processing unit 220, the SDRAM memory 212, and the nonvolatile memory 213. The layer-2 function unit 223 is connected to the layer-1 data transfer program 211a via the layer-1-side interface 223b, and is the function of implementing RoHC, and holds IP header information therein. The IP header information includes, for example, an ID indicating a type of update information (such as ID=1 and ID=0) and a vendor ID indicating a manufacturer.

The layer-2 function unit 223 is a processing unit that performs various processes on a packet that is acquired by the layer-1 data transfer program 211a and stored in the IP packet buffer 223d. The layer-2 function unit 223 includes the IP packet buffer 223d, an update-program storage buffer 223e, and the over-the-air download analyzing unit 223f.

The IP packet buffer 223d holds therein an IP packet that is received and assembled by the PDCP of the layer-2 programs 223a. The update-program storage buffer 223e holds therein a wireless function update program or wireless function update data which is update information generated using the packet stored in the IP packet buffer 223d.

The over-the-air download analyzing unit 223f detects a wireless function update program for updating the wireless function unit 210, receives the detected wireless function update program, and generates wireless function update data. Specifically, the over-the-air download analyzing unit 223f holds therein IP header information for over-the-air download, and detects a wireless function update program if a packet fitting this pattern is received. For example, the over-the-air download analyzing unit 223f stores therein "IP header, ID=1" as the IP header information held in the layer-2 function unit 223. If a packet attached with "ID=1" is stored in the IP packet buffer 223d, the over-the-air download analyzing unit 223f detects that a packet of a wireless function update program has been received.

When detecting that a packet of a wireless function update program has been received, the over-the-air download analyzing unit 223f reads out the IP packet of the wireless function update program from the IP packet buffer 223d, and references a vendor ID in the IP header. If the referenced vendor ID matches a vendor ID in the IP header information, the over-the-air download analyzing unit 223f references a port number in the TCP (Transmission Control Protocol) or UDP (User Datagram Protocol) layer of the IP packet. Namely, if the vendor ID in the IP header is the one indicating a vendor of the wireless communication apparatus 200, the over-the-air download analyzing unit 223f references a port number in the IP header or the like. Then, if the referenced port number is the one used in over-the-air download, the over-the-air download analyzing unit 223f detects that the over-the-air download has started.

When detecting that the over-the-air download has started, the over-the-air download analyzing unit 223f generates a wireless function update program or data by assembling the packet stored in the IP packet buffer 223d, and stores the generated wireless function update program or data in the update-program storage buffer 223e. Then, the over-the-air download analyzing unit 223f notifies the boot function unit 225 of information that the wireless function update program or update data has been generated and stored.

The real-time OS 224 is a task having a function of estimating the processing time required for a process, a mechanism for completing a process within a desired time even in a case where a plurality of processing requests come up at the same time, and the like. Furthermore, the real-time OS 224 holds task scheduling, and performs the highest-priority task based on priorities of tasks. For example, if it is branched due to an interrupt process by a rendezvous program 225b, the real-time OS 224 performs the highest-priority task at the point, such as a wireless processing function activate task.

The boot function unit 225 is a processing unit that boots, shuts down, or reboots the wireless communication apparatus 200 in accordance with the user's instruction operation or when receiving data including a command, such as a boot command, a shutdown command, or a reboot command. The boot function unit 225 includes an IPL (Initial Program Loader) 225a and the rendezvous program 225b.

The IPL 225a is stored in the nonvolatile memory 213. When the wireless communication apparatus 200 is powered on, the IPL 225a is read out from the nonvolatile memory 213, and is first activated. Furthermore, the IPL 225a loads an OS from a main storage unit (not illustrated) and expands the OS in a memory, and activates the OS.

The rendezvous program 225b performs the update of the function of the wireless function unit 210 or the CCPU, etc. using a wireless function update program or wireless function update data generated by the over-the-air download analyzing unit 223f of the layer-2 function unit 223. The rendezvous program 225b is a program that the rendezvous program 213a is read out from the nonvolatile memory 213 and executed due to an interrupt process by the boot function unit 225. Specifically, when the boot function unit 225 receives information that the wireless function update program or the like has been generated and stored from the over-the-air download analyzing unit 223f, it is branched to an interrupt process for performing the update process. At this time, the boot function unit 225 reads out and executes the rendezvous program 213a in the nonvolatile memory 213.

The rendezvous program 225b reads out and executes the wireless function update program or the like stored in the update-program storage buffer 223e by the over-the-air download analyzing unit 223f of the layer-2 function unit 223. Then, by executing the wireless function update program, the rendezvous program 225b updates a program or data for the wireless function unit 210 or the CCPU that is stored in the SDRAM memory 212 or the nonvolatile memory 213. As a result, the function of the wireless function unit 210 or the CCPU, etc. is updated. Furthermore, even when the rendezvous program 225b reads out not a wireless function update program but wireless function update data from the update-program storage buffer 223e, the rendezvous program 225b can update the function of the wireless function unit 210 or the CCPU, etc. The rendezvous program 225b can update the function of the wireless function unit 210 or the CCPU, etc., for example, by storing the read wireless function update data in a corresponding area of the SDRAM memory 212 or the nonvolatile memory 213 or by storing the read wireless function update data in the registry. Moreover, when completing the update of the function of the wireless function unit 210 or the CCPU, etc., the rendezvous program 225b generates an interrupt process to branch to the beginning of the main program of the real-time OS 224.

The application function unit 400 is a processing unit including an ACPU. Specifically, the application function unit 400 is connected to the wireless function unit 210 and the like, and for example, executes an application stored in the wireless communication apparatus 200 or an application acquired from the outside, and updates an application. For example, the application function unit 400 holds applications in a memory (not illustrated) or the like, and in accordance with the user's instruction operation, reads out a corresponding application from the memory, executes the application, and performs a display output to a display unit, such as a display, or a voice output.

Furthermore, if the application function unit 400 receives an "XOFF" signal from the terminal adaptation function unit 221, the application function unit 400 deactivates the functions, such as the function of the ACPU, and suspends the communication control of data communication or the like. Moreover, if the application function unit 400 receives an "XON" signal from the terminal adaptation function unit 221, or if the wireless communication apparatus 200 is rebooted, the application function unit 400 activates the functions, such as the function of the ACPU, and begins the communication control of data communication or the like.

Furthermore, the application function unit 400 updates an application held in the memory or the like. For example, the application function unit 400 acquires only a packet with "ID=0" attached to the IP header out of packets of update information received by the digital processing unit 211. Then, the application function unit 400 generates application function update data or an application function update program by assembling the packet attached with "ID=0". After that, the application function unit 400, for example, writes the generated application function update data on a memory or the like, or rewrites the registry or the like by executing the generated application function update program. In this manner, the application function unit 400 updates the function of the application function unit 400 or the ACPU, etc. The application function unit 400 can perform not only the update but also the installation of a new application.

Sequence of Update Process by Wireless Communication Apparatus

Figure 4:
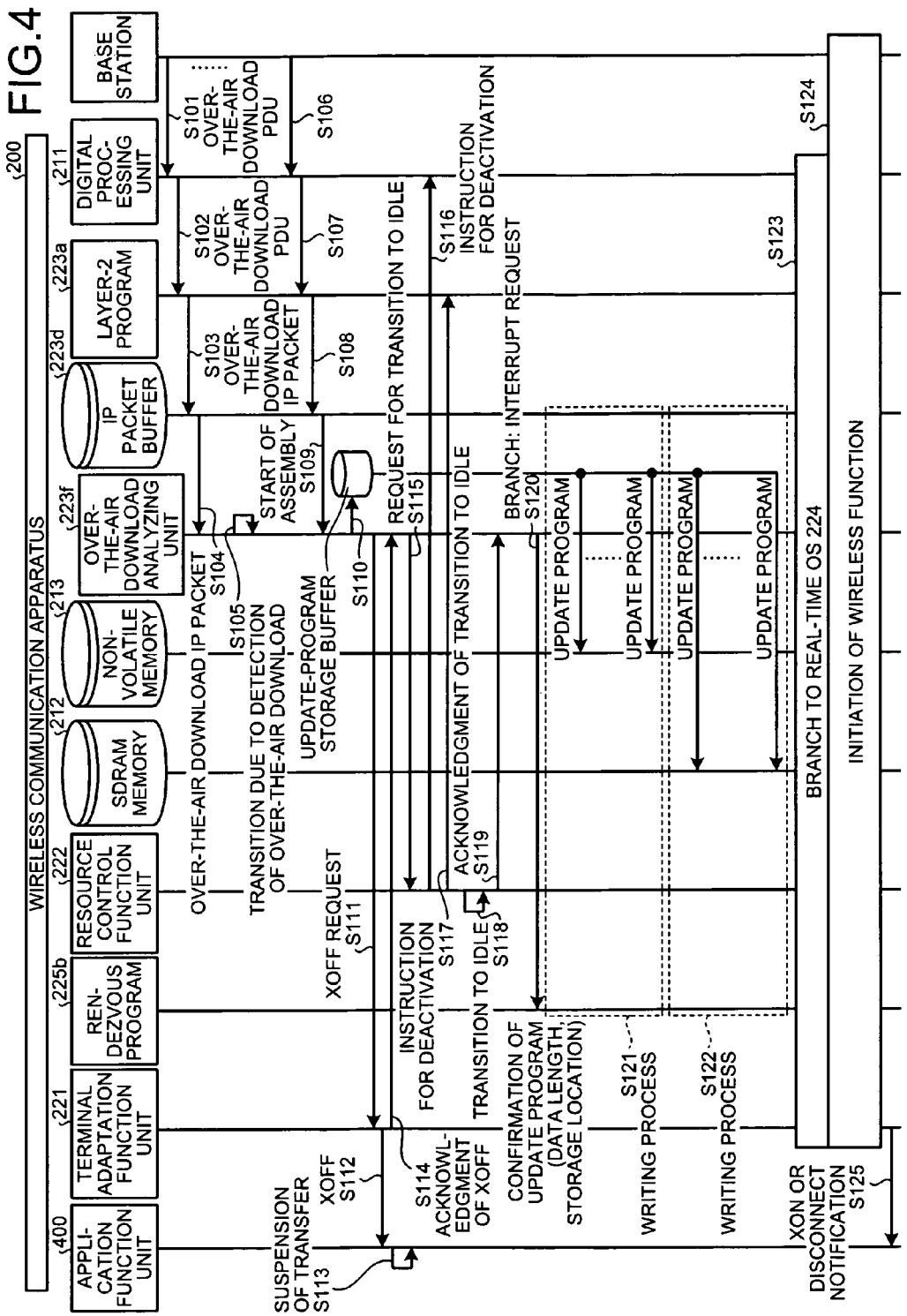
FIG. 4 is a diagram illustrating a sequence of a process performed by the wireless communication apparatus according to the second embodiment.

Subsequently, a sequence of an update process performed by the wireless communication apparatus 200 is explained with reference to FIG. 4. FIG. 4 is a diagram illustrating a sequence of a process performed by the wireless communication apparatus according to the second embodiment.

As illustrated in FIG. 4, the digital processing unit 211 of the wireless communication apparatus 200 receives an over-the-air download PDU transmitted from the management server via the base station (Step S101). Then, the layer-2 programs 223a of the layer-2 function unit 223 acquire only a PDU of an update program for updating the wireless function unit 210 out of the received PDUs (Step S102). Then, the layer-2 programs 223a store the acquired PDU as an IP packet in the IP packet buffer 223d (Step S103).

Subsequently, the over-the-air download analyzing unit 223f reads out the IP packet from the IP packet buffer 223d, references the IP header of the read IP packet (Step S104), and starts assembling the packet when detecting that the over-the-air download has started (Step S105).

After that, the over-the-air download analyzing unit 223f reads out all the over-the-air download PDUs received from the base station from the IP packet buffer 223d, and completes the assembly of the over-the-air download PDUs (Steps S106 to S110). The over-the-air download analyzing unit 223f generates a wireless function update program or wireless function update data by assembling the over-the-air download PDUs, and stores the generated wireless function update program or wireless function update data in the update-program storage buffer 223e.

Figure 5:
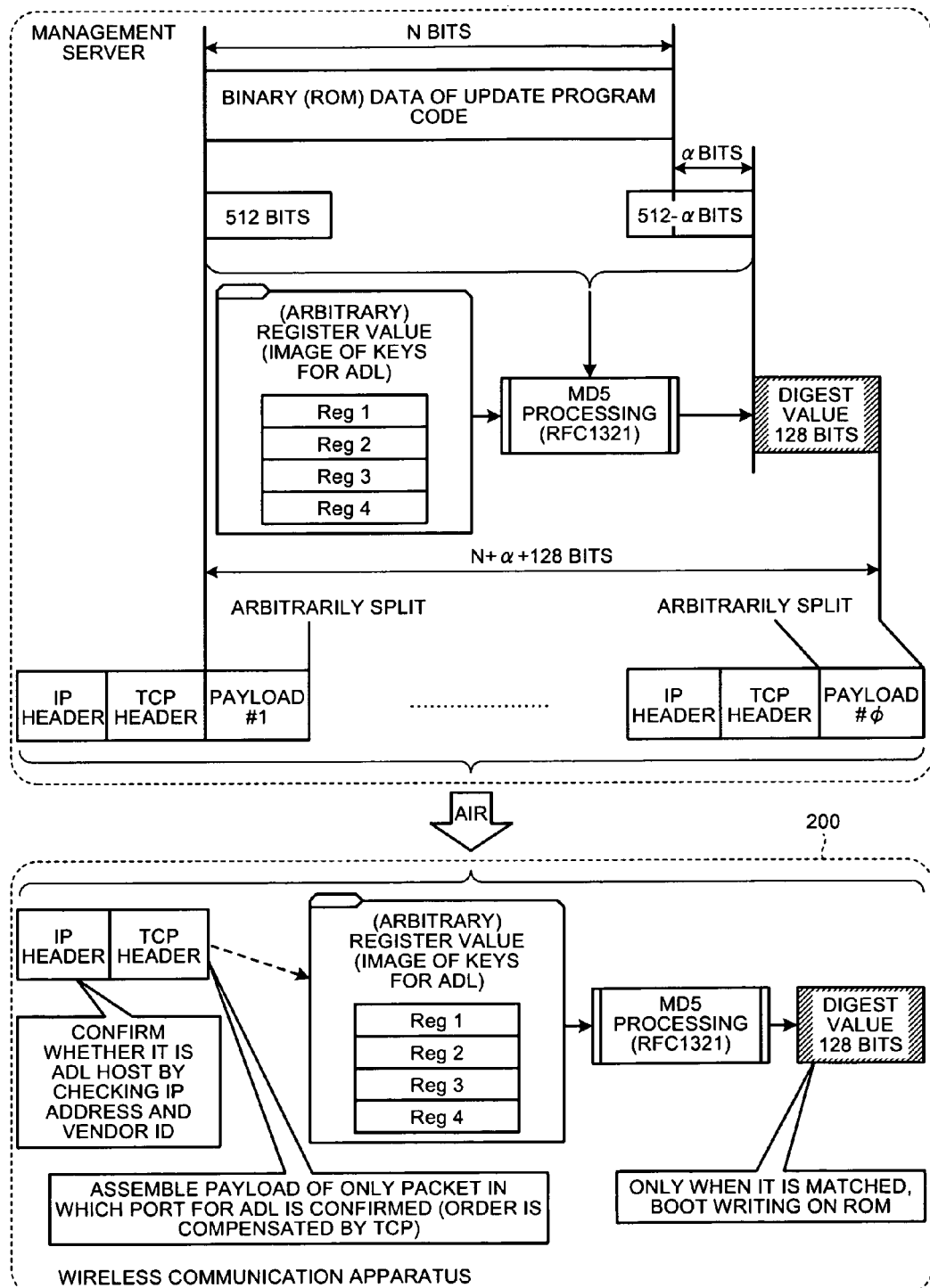
FIG. 5 is a diagram for explaining code authentication.

At this time, the over-the-air download analyzing unit 223f calculates a digest value from the generated wireless function update program or wireless function update data using the hash function, such as the MD5 (Message Digest Algorithm 5, RFC1321), and performs code authentication or the like. For example, as illustrated in FIG. 5, if binary data of an update program to be delivered by over-the-air download is N-bit data, the management server delivers the update program by splitting the data into 512-bit packets. As for the last packet of which the length cannot be 512 bits, the management server adds a bits to the last packet to have a 512-bit length, and delivers the packet. Here, (A+1)-numbers of packets, A-numbers of 512-bit packets and one (512-a)-bit packet, are delivered.

Then, the management server assigns the (A+1)-numbers of packets and an arbitrary register value to the hash function, such as the MD5, thereby calculating a 128-bit digest value. As a result, the number of bits subject to delivery is "N+α+128" bits. Namely, the management server delivers a payload of arbitrary bits that "N+α+128" bits is divided to the wireless communication apparatus 200. Therefore, the management server also delivers the calculated 128-bit digest value to the wireless communication apparatus 200.

When receiving such packets, the over-the-air download analyzing unit 223f of the wireless communication apparatus 200 stores a beginning address indicating a payload storage location of each packet in an arbitrary area. Subsequently, the over-the-air download analyzing unit 223f assigns the stored information to the hash function such as the MD5 (for example, the same function as the management server), thereby calculating a 128-bit digest value. Then, the over-the-air download analyzing unit 223f performs code authentication for determining whether the calculated digest value matches the digest value received from the management server. If the calculated digest value matches the digest value received from the management server, processes at Step S111 and later Steps described below are performed. FIG. 5 is a diagram for explaining the code authentication.

To return to the explanation of FIG. 4, the over-the-air download analyzing unit 223f, which has generated the wireless function update program or wireless function update data, outputs a signal "XOFF" for deactivating the wireless function of the CCPU and the like to the terminal adaptation function unit 221 (Step S111). When receiving the signal "XOFF", the terminal adaptation function unit 221 makes the transition to the state of "Off Line Command Mode", and outputs a signal "XOFF" to the application function unit 400 (Step S112). Then, the application function unit 400 suspends a process of transferring data, voice, or the like (Step S113).

Furthermore, the terminal adaptation function unit 221, which has made the transfer process suspended, transmits a signal "XOFF" to the over-the-air download analyzing unit 223f (Step S114). When receiving the signal "XOFF", the over-the-air download analyzing unit 223f transmits a request to transit the state of the LTE from ACTIVE to IDLE to the resource control function unit 222 (Step S115).

When receiving the request to make the transition to IDLE, the resource control function unit 222 outputs an instruction for deactivation of the wireless function to each of the digital processing unit 211 and the layer-2 programs 223a (Steps S116 and S117). After that, the resource control function unit 222 transits the state of the LTE from ACTIVE to IDLE (Step S118), and notifies the over-the-air download analyzing unit 223f of completion of the state transition (Step S119).

Then, the over-the-air download analyzing unit 223f outputs an interrupt request to the boot function unit 225, and the boot function unit 225 generates an interrupt process (Step S120). Namely, the boot function unit 225 reads out the rendezvous program 213a from the nonvolatile memory 213, and, as the rendezvous program 225b, executes the rendezvous program 213a. At this time, the rendezvous program 225b acquires a data length of the wireless function update program or wireless function update data and update program information indicating a storage location from the over-the-air download analyzing unit 223f.

The rendezvous program 225b reads out the wireless function update program or the like from the update-program storage buffer 223e using the acquired data length and storage location, and executes the read wireless function update program, and then performs a writing process of storing the update program or data in the nonvolatile memory 213 (Step S121). Furthermore, the rendezvous program 225b executes the wireless function update program or the like read out from the update-program storage buffer 223e, and performs a writing process of storing the update program or data in the SDRAM memory 212 (Step S122).

After that, when completing the writing process, the rendezvous program 225b branches the currently-performing update process to the real-time OS 224 (Step S123). Specifically, the rendezvous program 225b outputs information that the writing process has been completed to the terminal adaptation function unit 221, the resource control function unit 222, and the layer-2 function unit 223. After that, the rendezvous program 225b generates an interrupt process in the currently-performing update process to branch to the real-time OS 224.

The real-time OS 224 executes a task of activating the IPL 225a of the boot function unit 225, a task of activating the wireless function, and the like, thereby activating the wireless function (Step S124). After that, the terminal adaptation function unit 221 and the resource control function unit 222 perform Camp-On and the like, and output a signal "XON" for initiation of the wireless processing, a disconnect notification for deleting the current connection, and the like to the application function unit 400 (Step S125). In this way, the ACPU of the application function unit 400, the CCPU of the wireless function unit 210, and the like are rebooted, and the update program is reflected.

Flow of Process in Over-the-Air Download Analyzing Unit

Figure 6:
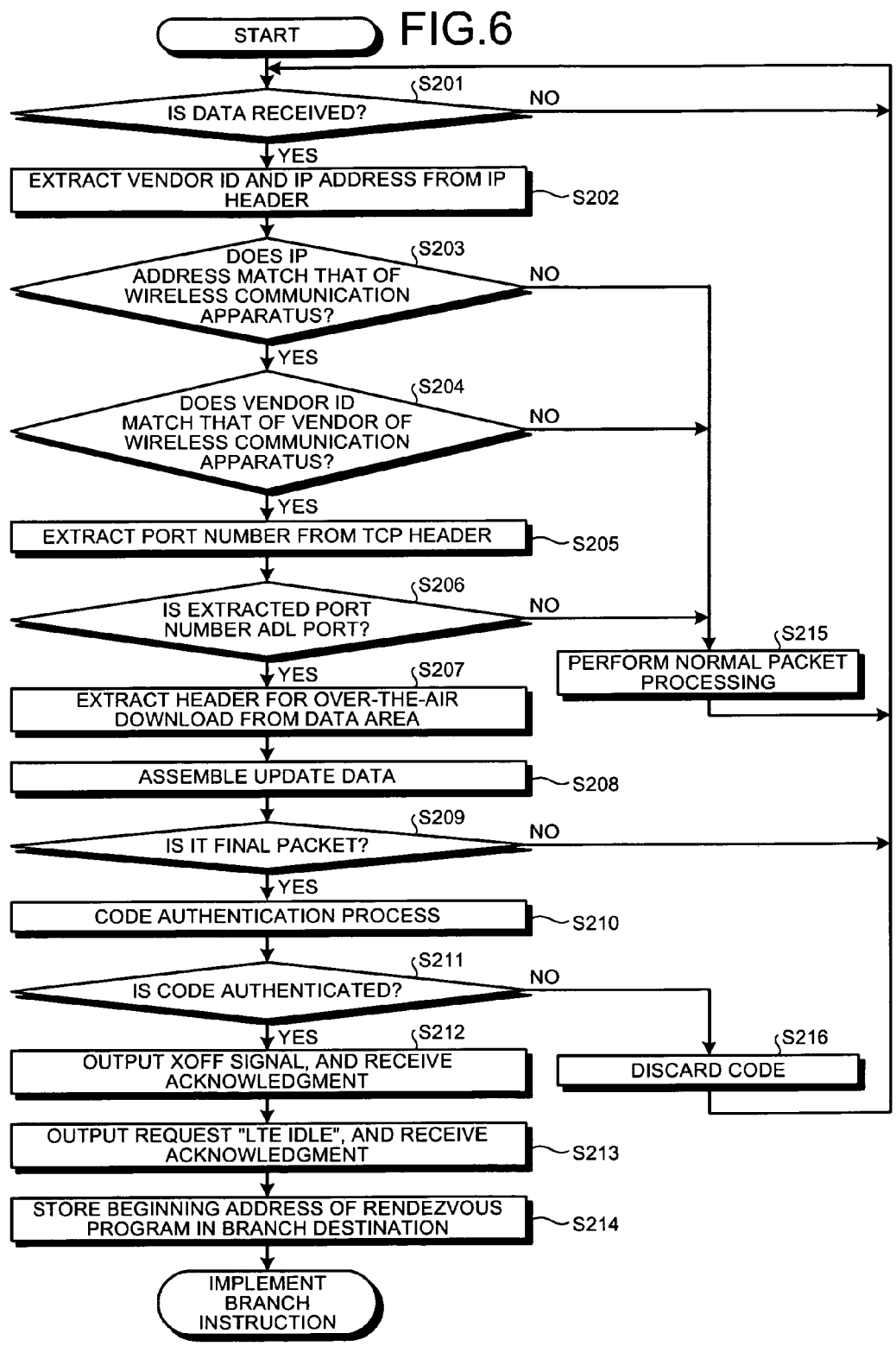
FIG. 6 is a flowchart illustrating a flow of a process performed by an over-the-air download analyzing unit 223f.

Subsequently, a flow of a process performed by the over-the-air download analyzing unit 223f is explained with reference to FIG. 6. FIG. 6 is a flowchart illustrating the flow of the process performed by the over-the-air download analyzing unit 223f.

As illustrated in FIG. 6, the over-the-air download analyzing unit 223f reads out an IP packet that is received by the digital processing unit 211 and the layer-2 programs 223a and stored in the IP packet buffer 223d (Step S201). Then, the over-the-air download analyzing unit 223f extracts a vendor ID and a destination IP address from the IP header of the read IP packet (Step S202).

The over-the-air download analyzing unit 223f determines whether the extracted destination IP address is an address of the wireless communication apparatus 200 (Step S203). If it is determined that the extracted destination IP address is an address of the wireless communication apparatus 200 (YES at Step S203), the over-the-air download analyzing unit 223f determines whether the extracted vendor ID is identical to that of the vendor of the wireless communication apparatus 200 (Step S204).

If the extracted vendor ID is identical to that of the vendor of the wireless communication apparatus 200 (YES at Step S204), the over-the-air download analyzing unit 223f extracts a port number from the TCP header of the IP packet attached with the vendor ID (Step S205).

If the extracted port number is a port number for over-the-air download (YES at Step S206), the over-the-air download analyzing unit 223f extracts a header for over-the-air download from an data area of the IP packet (Step S207). Then, the over-the-air download analyzing unit 223f assembles a packet using the extracted header for over-the-air download (Step S208).

After that, the over-the-air download analyzing unit 223f determines whether the processing IP packet subjected to the above processes is the final packet, i.e., the last packet of update information from the extracted header for over-the-air download (Step S209).

If the over-the-air download analyzing unit 223f determines that the processing IP packet subjected to the above processes is not the final packet (NO at Step S209), the above processes at Steps S201 to S209 are repeated.

On the other hand, if the over-the-air download analyzing unit 223f determines that the processing IP packet subjected to the above processes is the final packet (YES at Step S209), the over-the-air download analyzing unit 223f calculates a digest value using the hash function, and performs code authentication (Step S210).

If the code is authenticated (YES at Step S211), the over-the-air download analyzing unit 223f outputs an XOFF signal indicating deactivation of the wireless processing function to the terminal adaptation function unit 221, and receives an acknowledgment of the deactivation of the wireless processing function from the terminal adaptation function unit 221 (Step S212). Then, the over-the-air download analyzing unit 223f outputs a request "LTE IDLE" for putting into a state just after the power off by deactivating the LTE to the resource control function unit 222, and receives an acknowledgment of the request "LTE IDLE" from the resource control function unit 222 (Step S213).

In this manner, the over-the-air download analyzing unit 223f ask for an acknowledgment of the deactivation of the wireless processing function with respect to each of the terminal adaptation function unit 221 and the resource control function unit 222, thereby deactivating the wireless function of the wireless communication apparatus 200. The over-the-air download analyzing unit 223f stores a beginning address of the rendezvous program 213a in a branch destination, i.e., an area (an address) in the SDRAM memory 212 where the branch destination is stored, and transmits an interrupt request to the boot function unit 225 (Step S214).

On the other hand, if the extracted destination IP address is not an address of the wireless communication apparatus 200 (NO at Step S203), the over-the-air download analyzing unit 223f determines that the received packet is not a packet of update information, and performs normal packet processing (Step S215). The normal packet processing is, for example, a process performed when voice data or an e-mail is received. Furthermore, if the extracted vendor ID is not identical to that of the vendor of the wireless communication apparatus 200 (NO at Step S204), the over-the-air download analyzing unit 223f performs normal packet processing (Step S215). Moreover, if the extracted port number is not a port number for over-the-air download (NO at Step S206), the over-the-air download analyzing unit 223f performs normal packet processing (Step S215).

Furthermore, if the code is not authenticated (NO at Step S211), the over-the-air download analyzing unit 223f discards the code failed in the authentication (Step S216), and performs the processes from Step S201.

Flow of Process in Rendezvous Program

Figure 7:
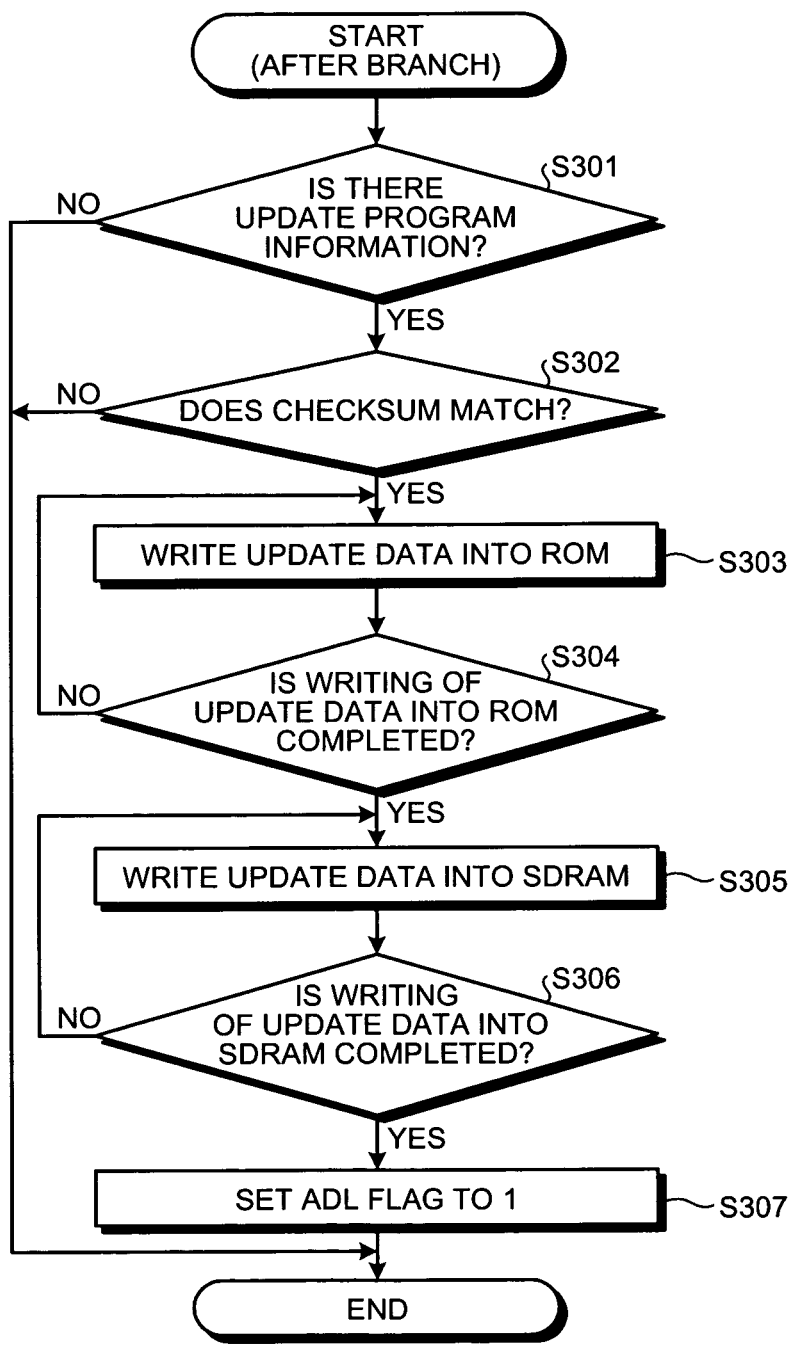
FIG. 7 is a flowchart illustrating a flow of a process performed by a rendezvous program 225b.

Subsequently, a flow of a process performed by the rendezvous program 225b is explained with reference to FIG. 7. FIG. 7 is a flowchart illustrating the flow of the process performed by the rendezvous program 225b.

As illustrated in FIG. 7, when receiving an interrupt request, the boot function unit 225 reads out the rendezvous program 213a from the nonvolatile memory 213, and determines whether the rendezvous program 213a acquires information on an update program from the over-the-air download analyzing unit 223f (Step S301). At this time, the read rendezvous program 213a is executed as the rendezvous program 225b.

When acquiring the information on the update program (YES at Step S301), the rendezvous program 225b reads out a wireless function update program or the like from the update-program storage buffer 223e in accordance with the acquired information, and checks a checksum (Step S302).

When the rendezvous program 225b confirms that there is no error from the checksum of the read wireless function update program or the like (YES at Step S302), the rendezvous program 225b executes the read wireless function update program or the like, and writes update data on the nonvolatile memory 213 (Step S303).

When completing the writing of the update data on the nonvolatile memory 213 (YES at Step S304), the rendezvous program 225b executes the read program, and writes update data on the SDRAM memory 212 (Step S305).

After that, when completing the writing of the update data on the SDRAM memory 212 (YES at Step S306), the rendezvous program 225b sets an ADL flag to 1 indicating completion of the update process, and terminates the over-the-air download (upload) process (Step S307). The ADL flag is an identifier indicating whether the execution of an update program is completed, and is set at 0 from the start of the process illustrated in FIG. 6 until completion. For example, when an update program is forcibly shut down during execution due to power-off or an unexpected trouble, if the ADL flag is set at 0, the update program is re-executed; if the ADL flag is set at 1, it indicates that there is no need to re-execute the update program. Alternatively, the ADL flag can be incremented by 1 with each step of the process illustrated in FIG. 6 or 7; so, if the update program is forcibly shut down, where to re-execute can be determined by reference to the ADL flag.

Effects of Second Embodiment

In this manner, according to the second embodiment, even when the wireless communication apparatus 200 receives update information for updating the wireless function unit 210, there is no need to transmit the update information to the application function unit 400. As a result, it is possible to reduce the time taken to update the wireless function without depending on the application function unit 400, and it is possible to achieve the high-speed update of the wireless function.

Figure 8:
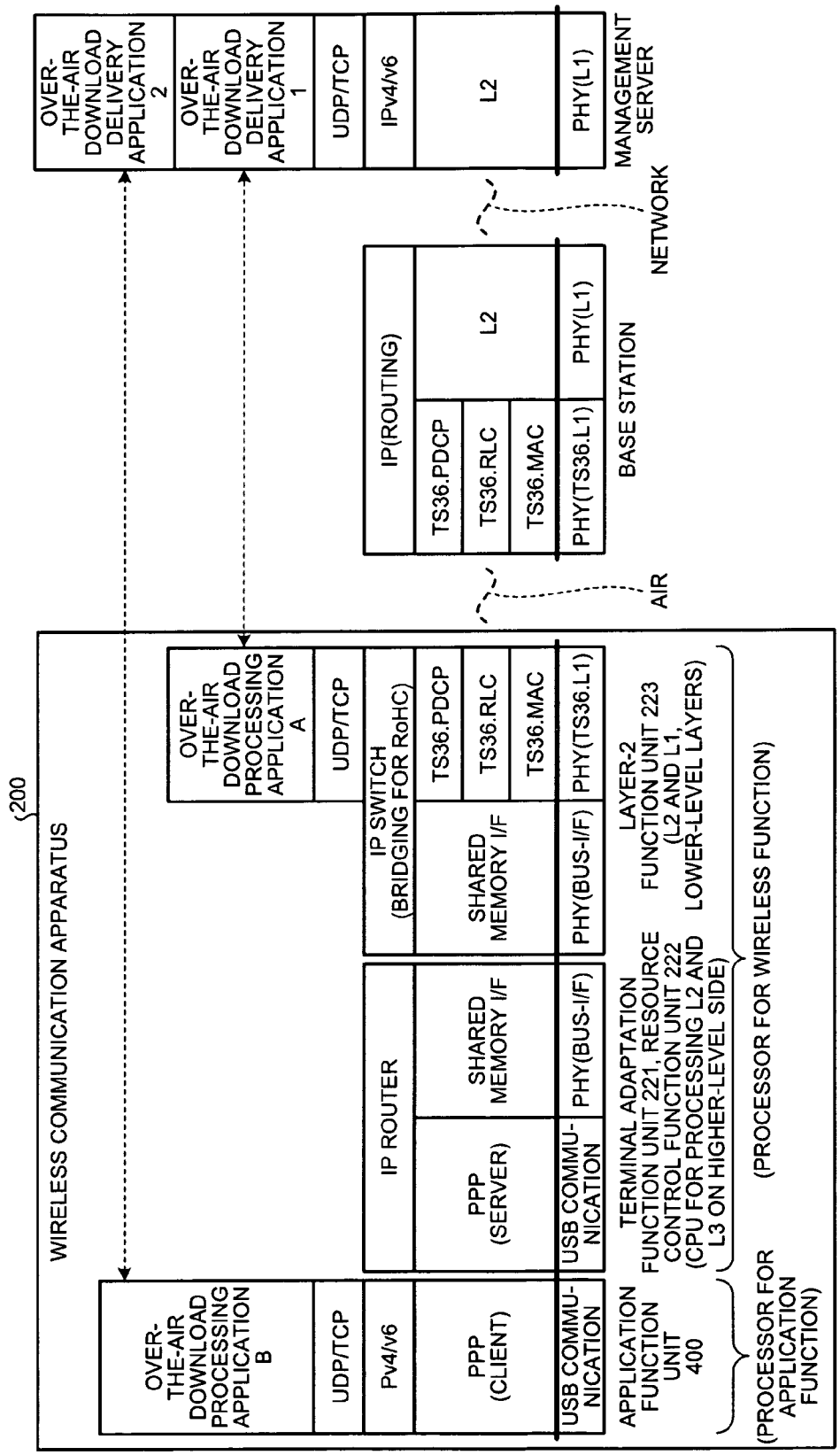
FIG. 8 is a diagram for explaining how an application function unit 400 and a wireless function unit 210 each perform an over-the-air download process.

Specifically, as illustrated in FIG. 8, the management server, which provides update information, has a communication processing function capable of controlling the physical layer (PHY) defining a protocol of layer 1 and the data link layer defining a protocol of layer 2, such as the Ethernet (registered trademark). Furthermore, the management server has a communication processing function capable of controlling the network layer defining a protocol, such as the Internet Protocol version 4 (IPv4) or the Internet Protocol version 6 (IPv6). Moreover, the management server has a communication processing function capable of controlling the transport layer defining a protocol such as the UDP/TCP. Then, the management server holds an over-the-air download delivery application 1 for delivering update information of the wireless function and an over-the-air download delivery application 2 for delivering update information of the application function in the application layer higher than the transport layer. Namely, the management server delivers an over-the-air download as update information using the protocol of the application layer higher than the UDP/TCP.

On the other hand, the base station has, as illustrated in FIG. 8, a communication processing function capable of controlling the physical layer (PHY) defining a protocol of layer 1 and the data link layer defining a protocol of layer 2 in which the PDCP, the RLC, the MAC, and the like perform processing. Furthermore, the base station has a communication processing function capable of controlling the network layer in which the IP routing for transmitting and receiving a TCP/IP packet is implemented. The base station does not have a function capable of processing a higher-level layer higher than the transport layer, such as the UDP/TCP.

And, the wireless communication apparatus 200 has, as illustrated in FIG. 8, the layer-2 function unit 223 capable of controlling respective protocols defined in the physical layer (PHY), the data link layer, and the network layer. Specifically, the layer-2 function unit 223 has a communication processing function capable of controlling the physical layer (PHY), such as a bus interface. Furthermore, the layer-2 function unit 223 has a communication processing function capable of controlling the data link layer, such as a shared memory interface, the PDCP, the RLC, and the MAC. Moreover, the layer-2 function unit 223 has a communication processing function capable of controlling the transport layer in which RoHC can be implemented. Furthermore, the layer-2 function unit 223 has the communication processing function capable of controlling the transport layer defining a protocol such as UDP/TCP, and holds an over-the-air download processing application A for receiving update information and executing the update. For example, the layer-2 function unit 223 has, as the over-the-air download processing application A, the over-the-air download analyzing unit 223f and the rendezvous program 225b. As a result, the layer-2 function unit 223 can receive an over-the-air download indicating update information of the wireless function of the CCPU or the like on the application layer higher than UDP/TCP, and execute the update.

Furthermore, the wireless communication apparatus 200 has, as illustrated in FIG. 8, the terminal adaptation function unit 221 and the resource control function unit 222 that are capable of controlling respective protocols defined in the physical layer (PHY), the data link layer, and the network layer. Specifically, the terminal adaptation function unit 221 and the resource control function unit 222 have a communication processing function capable of controlling USB (Universal Serial Bus) communication and the like. Furthermore, the terminal adaptation function unit 221 and the resource control function unit 222 have a communication processing function capable of controlling a PPP (Point-to-Point Protocol) server function, a shared memory interface, and the like. Moreover, the terminal adaptation function unit 221 and the resource control function unit 222 have a communication processing function capable of controlling the IP routing for transmitting and receiving a TCP/IP packet.

Moreover, the wireless communication apparatus 200 has, as illustrated in FIG. 8, the application function unit 400 capable of controlling respective protocols defined in the physical layer (PHY), the data link layer, the network layer, the transport layer, and the application layer. Specifically, the application function unit 400 has a communication processing function capable of controlling the physical layer (PHY) such as USB communication, the data link layer such as a PPP client function, the network layer such as the IPv4 or the IPv6, the transport layer such as the UDP/TCP, and the like. Furthermore, the application function unit 400 holds an over-the-air download processing application B for receiving update information and executing the update in the application layer higher than the transport layer. Namely, the application function unit 400 can receive an over-the-air download indicating update information for an application, such as the ACPU, and execute the update on the application layer higher than the UDP/TCP.

Therefore, in the wireless communication apparatus 200, as for a program for updating the application function unit 400 that is transmitted from the management server, the program can be processed by only the application function unit 400. Furthermore, in the wireless communication apparatus 200, as for a program for updating the function of the wireless function unit 210 or the CCPU, etc. that is transmitted from the management server, the program can be processed by the layer-2 function unit 223 of the wireless function unit 210 or the rendezvous program 225b. Namely, in the wireless communication apparatus 200, when a program for updating the function of the wireless function unit 210 or the CCPU, etc. is processed, unlike the conventional technology, there is no need to process the program in the application function unit 400. Therefore, it is possible to reduce the time taken to update the wireless function unit 210. FIG. 8 is a diagram for explaining how the application function unit 400 and the wireless function unit 210 each perform an over-the-air download process.

Furthermore, according to the second embodiment, at the time of execution of the update of the wireless function, the function of the wireless function unit 210 or the CCPU is deactivated, and a deactivate request to deactivate the function of the application function unit 400 is transmitted to the application function unit 400. After the function of the application function unit 400 is deactivated, the update process is performed, and the function of the wireless function unit 210 or the CCPU is updated. As a result, the update process can be performed after the wireless function unit 210, the CCPU, the application function unit 400, and the ACPU all suspend respective processes. Therefore, it is possible to prevent a trouble due to the update process from occurring on the wireless function unit 210, the CCPU, the application function unit 400, and the ACPU as much as possible.

[c] Third Embodiment

The embodiments of the present invention are described above; furthermore, the present invention can be implemented in various different forms other than the embodiments described above. Different embodiments are described below.

Object of Over-the-Air Download

In the above embodiments, as an object of over-the-air download, an update program or update data is described as an example; execution of the update program or update data can be made on any layer. For example, an update program or update data to be over-the-air downloaded can be firmware or software of layers 1 to 3.

Data Card

In the above embodiments, there is described a case where the over-the-air download is performed via a network, such as wireless communication; however, it is not limited to this case, and for example, a data card holding therein upload data can be used.

Specifically, when a data card holding therein upload data is accepted, the wireless function unit 210 of the wireless communication apparatus 200 acquires the upload data from the data card. Then, if the wireless function unit 210 determines that the acquired upload data is upload data for the function of the wireless function unit 210 or the CCPU, etc. from an ID attached to the acquired upload data or the like, the wireless function unit 210 performs an upload process (an over-the-air download process) using the data. On the other hand, if the wireless function unit 210 determines that the acquired upload data is data for the application function unit 400, the wireless function unit 210 transmits the data to the application function unit 400. In this way, even in the case of using a data card, it is possible to process data in the same manner as in the above embodiments, and it is possible to reduce the time taken for the update of the wireless function unit 210.

System

Out of the processes described in the present embodiments, all or part of the process described as the one performed automatically (for example, the update-information download process, the wireless-function deactivating process, and the like) can be performed manually. Or, all or part of the process described as the one performed manually (for example, the data-card inserting process and the like) can be performed automatically by using the publicly-known method. In addition, processing procedures (for example, those illustrated in FIGS. 4 to 6 and the like), control procedures, specific names, and information including various data and parameters that are illustrated in the above specification and the drawings can be arbitrarily changed unless otherwise specified.

Furthermore, respective elements of the apparatuses illustrated in the drawings are functionally conceptual ones, and do not always have to be physically configured as illustrated in the drawings. Namely, specific forms of dispersion and integration of the elements in each apparatus are not limited to those illustrated in the drawings, and all or part of them can be configured to be functionally or physically dispersed or integrated in arbitrary units depending on various loads or use conditions. For example, the wireless processing unit 220 and the digital processing unit 211 can be integrated into one unit, or the wireless processing unit 220 can be divided into a plurality of function units.

Program

Each of the processes described in the above embodiments can be realized by causing a computer system, such as a personal computer or a workstation, to execute a program prepared in advance. An example of a computer system that executes a program having the same functions as the wireless communication apparatus described in the above embodiment.

Figure 9:
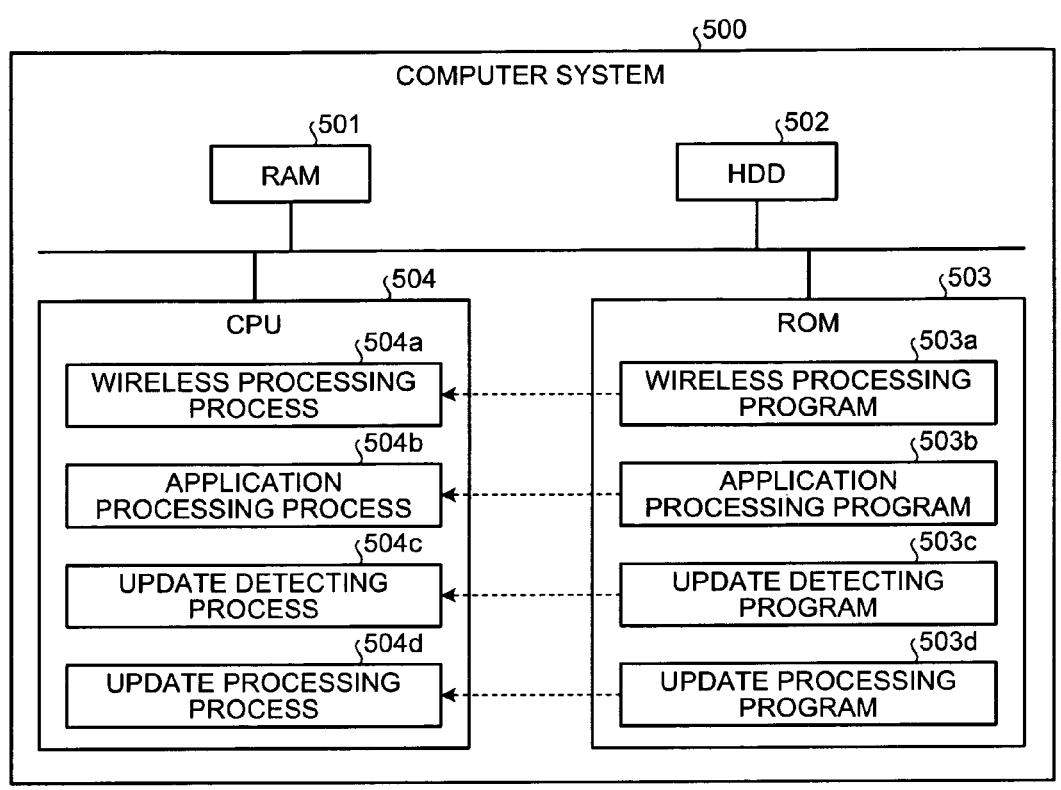
FIG. 9 is a diagram illustrating a computer system 500 that executes a wireless communication processing program.
Figure 10:
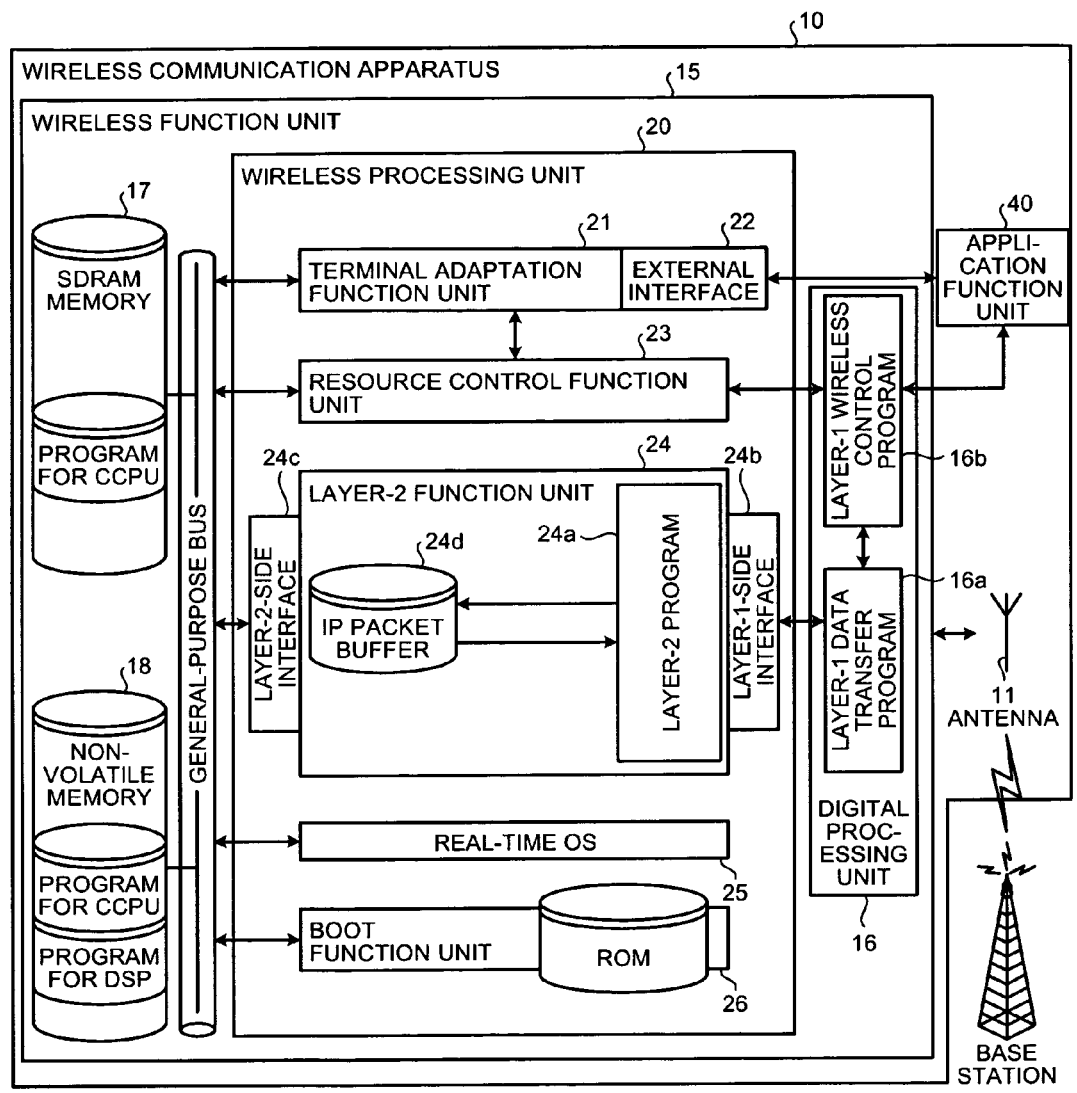
FIG. 10 is a block diagram illustrating a configuration of a wireless communication apparatus according to a conventional technology.
Figure 11:
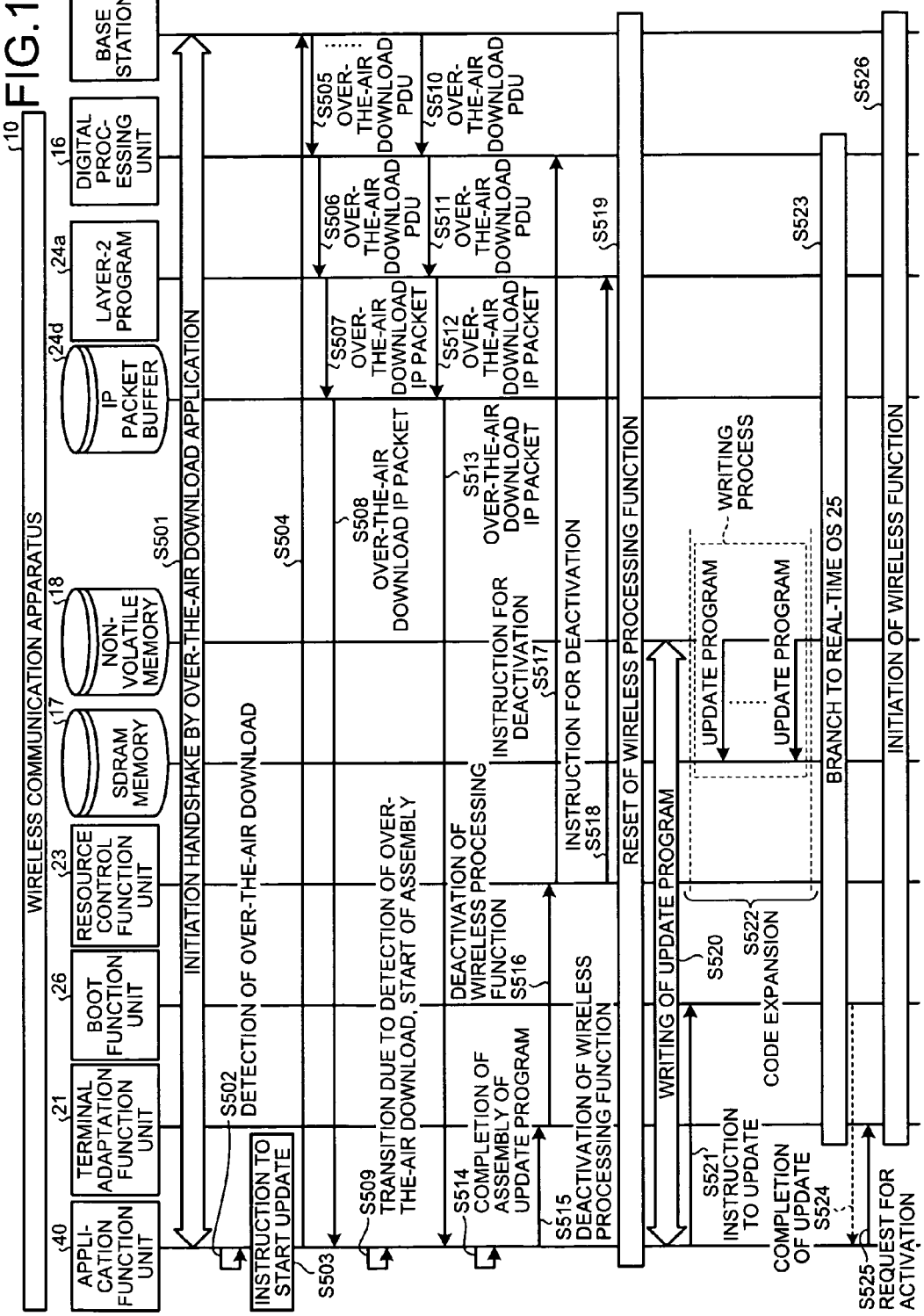
FIG. 11 is a sequence diagram illustrating a flow of a conventional update process.
Figure 12:
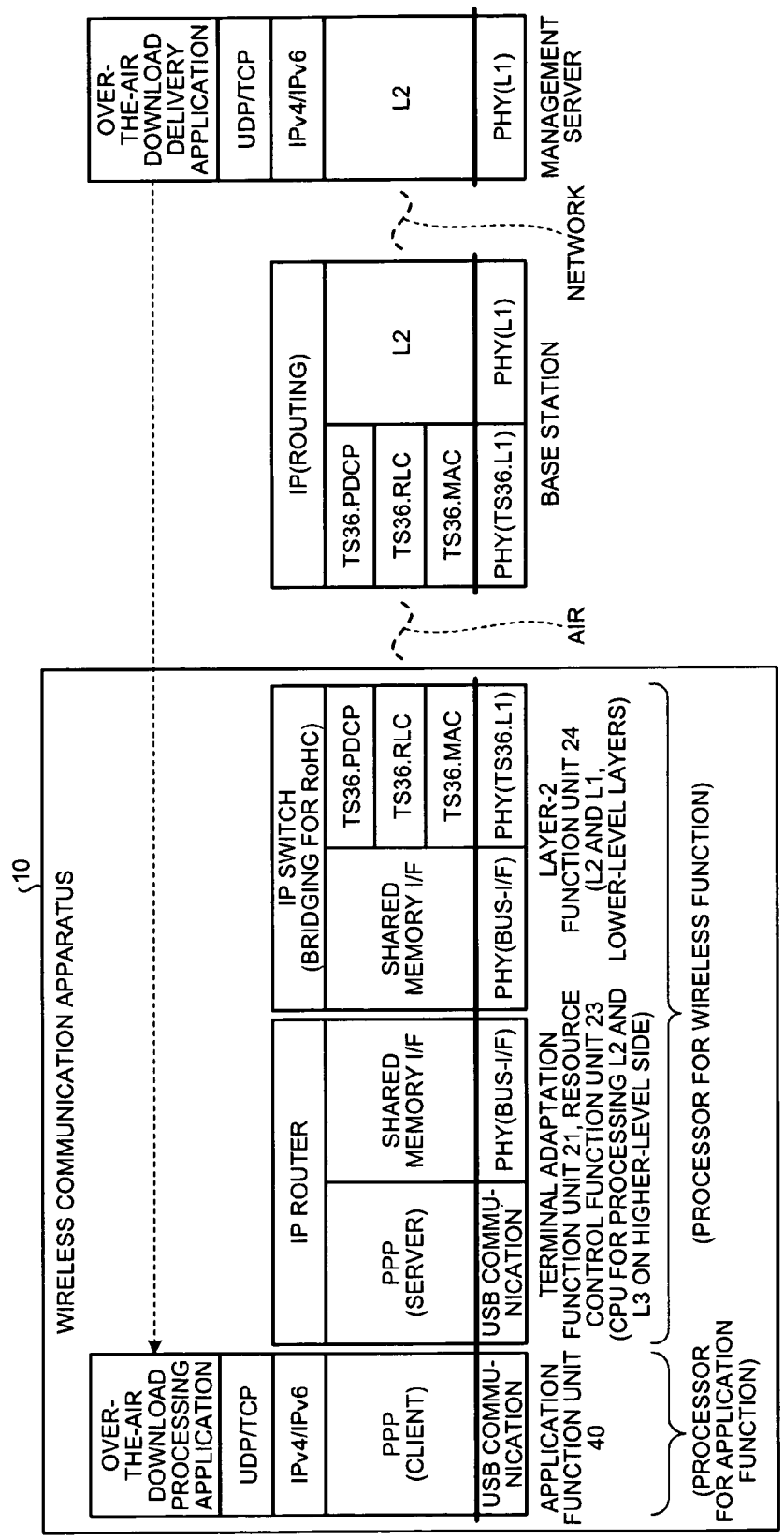
FIG. 12 is a diagram illustrating the flow of the conventional update process.

FIG. 9 is a diagram illustrating a computer system 500 that executes a wireless communication processing program. As illustrated in FIG. 9, the computer system 500 is composed of a RAM 501, an HDD 502, a ROM 503, and a CPU 504. In the ROM 503, a program fulfilling the same functions as the wireless communication apparatus described in the above embodiment is stored in advance. That is, as illustrated in FIG. 9, a wireless processing program 503a, an application processing program 503b, an update detecting program 503c, and an update processing program 503d are stored in the ROM 503 in advance.

The CPU 504 reads out and executes these programs 503a to 503d, thereby performing various processes. That is, as illustrated in FIG. 9, the CPU 504 performs a wireless processing process 504a, an application processing process 504b, an update detecting process 504c, and an update processing process 504d. The wireless processing process 504a corresponds to the wireless processing unit 220 illustrated in FIG. 3, and the application processing process 504b corresponds to the application function unit 400. Furthermore, the update detecting process 504c and the update processing process 504d correspond to the over-the-air download analyzing unit 223f and the rendezvous program 225b.

The HDD 502 stores therein various data and the like that are used in the above processes 504a to 504d; for example, the HDD 502 stores therein the rendezvous program 213a illustrated in FIG. 3 and the like.

The above programs 503a to 503d do not always have to be stored in the ROM 503; for example, the programs 503a to 503d can be stored in a "portable physical medium" to be inserted into the computer system 500, such as a flexible disk (FD), a CD-ROM, a magneto-optic (MO) disk, a DVD disk, or an IC card, a "fixed physical medium" provided outside or inside of the computer system 500, such as a hard disk drive (HDD), or "another computer system" connected to the computer system 500 via a public line, the Internet, a LAN, a WAN, or the like, and the computer system 500 reads out the programs from any of the above recording media, and executes the programs.

Namely, in this embodiment, a program is recorded on a recording medium, such as the above-mentioned "portable physical medium", "fixed physical medium", and "communication medium", in a computer-readable form. The computer system 500 reads out the program from the recording medium, and executes the program, thereby achieving the same functions as the wireless communication apparatus described in the above embodiment. The program in this embodiment is not limited to be executed by the computer system 500; the present invention can be similarly applied to a case where the program is executed by another computer system or a server or a case where the program is executed by another computer system and the server in cooperation with each other.

According to an aspect of a wireless communication apparatus, a wireless communication method, and a wireless communication program disclosed in the present application, it is possible to reduce the time taken to update a wireless function.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus comprising:
a wireless processing unit that performs wireless communication; and
an application processing unit that executes an application, wherein
the wireless processing unit comprises:
an update detecting unit that detects reception of wireless function update information for updating a function of the wireless processing unit when update information for updating any function of the wireless communication apparatus is received; and
an update processing unit that updates the function of the wireless processing unit, if the reception of wireless function update information is detected by the update detecting unit, by performing an update process specified in the wireless function update information by a wireless layer-2 protocol without transmitting the wireless function update information to the application processing unit that executes the application stored in the wireless communication apparatus by a processor for the application,
wherein the wireless processing unit receives the wireless function update information when the wireless communication apparatus performs a wireless function update process, and receives data other than the wireless function update information when the wireless communication apparatus performs a normal data communication process,
the wireless processing unit controls respective protocols defined in a physical layer (PHY), a data link layer, and a network layer from among protocols having the physical layer (PHY), the data link layer, the network layer, a transport layer, and an application layer to perform wireless communication,
the update detecting unit of the wireless processing unit acquires an Internet Protocol (IP) packet that has been assembled after controlling the physical layer (PHY) and the data link layer from wireless signals transmitted and received using protocols of upper layers that are equal to or higher than the transport layer and detects the reception of the wireless function update information including a program and/or data that define the update process for updating the function of the wireless processing unit when header information of the Internet Protocol (IP) packet corresponds to a predetermined pattern that has been previously stored, and
the update processing unit of the wireless processing unit assembles a plurality of the Internet Protocol (IP) packets of which reception of wireless function update information has been detected by the update detecting unit to generate the wireless function update information and performs the update process based on the generated wireless function update information to update the function of the wireless processing unit.

2. The wireless communication apparatus according to claim 1, wherein in execution of the update process, the update processing unit deactivates the function of the wireless processing unit, and transmits a deactivate request for deactivation of a function of the application processing unit to the application processing unit, and then updates the function of the wireless processing unit by performing the update process after the function of the application processing unit is deactivated.

3. The wireless communication apparatus according to claim 1, wherein the update detecting unit and the update processing unit are executed by a layer-2 processing unit that implements a packet data convergence protocol.

4. A wireless communication method comprising:
detecting reception of wireless function update information for updating a function of a wireless processing unit that performs wireless communication, when update information for updating any function of a wireless communication apparatus is received; and
updating the function of the wireless processing unit, if reception of wireless function update information is detected at the detecting, by performing an update process specified in the wireless function update information by a wireless layer-2 protocol without transmitting the wireless function update information to an application processing unit that executes the application stored in the wireless communication apparatus by a processor for the application,
wherein the wireless processing unit receives the wireless function update information when the wireless communication apparatus performs a wireless function update process, and receives data other than the wireless function update information when the wireless communication apparatus performs a normal data communication process, the wireless processing unit controls respective protocols defined in a physical layer (PHY), a data link layer, and a network layer from among protocols having the physical layer (PHY), the data link layer, the network layer, a transport layer, and an application layer to perform wireless communication, an update detecting unit of the wireless processing unit acquires an Internet Protocol (IP) packet that has been assembled after controlling the physical layer (PHY) and the data link layer from wireless signals transmitted and received using protocols of upper layers that are equal to or higher than the transport layer and detects the reception of the wireless function update information including a program and/or data that define the update process for updating the function of the wireless processing unit when header information of the Internet Protocol (IP) packet corresponds to a predetermined pattern that has been previously stored, and an update processing unit of the wireless processing unit assembles a plurality of the Internet Protocol (IP) packets of which reception of wireless function update information has been detected by the update detecting unit to generate the wireless function update information and performs the update process based on the generated wireless function update information to update the function of the wireless processing unit.

5. The wireless communication method according to claim 4, wherein in execution of the update process, the updating includes deactivating the function of the wireless processing unit, and transmitting a deactivate request for deactivation of a function of the application processing unit to the application processing unit, and then updating the function of the wireless processing unit by performing the update process after the function of the application processing unit is deactivated.

6. The wireless communication method according to claim 4, wherein the detecting and the updating are executed by a layer-2 processing unit that implements a packet data convergence protocol.

7. A computer readable storage medium having stored therein a wireless communication causing a computer to execute a process comprising:

detecting reception of wireless function update information for updating a function of a wireless processing unit that performs wireless communication, when update information for updating any function of a wireless communication apparatus is received; and updating the function of the wireless processing unit, if reception of wireless function update information is detected at the detecting, by performing an update process specified in the wireless function update information by a wireless layer-2 protocol without transmitting the wireless function update information to an application processing unit that executes the application stored in the wireless communication apparatus by a processor for the application, wherein the wireless processing unit receives the wireless function update information when the wireless communication apparatus performs a wireless function update process, and receives data other than the wireless function update information when the wireless communication apparatus performs a normal data communication process, the wireless processing unit controls respective protocols defined in a physical layer (PHY), a data link layer, and a network layer from among protocols having the physical layer (PHY), the data link layer, the network layer, a transport layer, and an application layer to perform wireless communication, an update detecting unit of the wireless processing unit acquires an Internet Protocol (IP) packet that has been assembled after controlling the physical layer (PHY) and the data link layer from wireless signals transmitted and received using protocols of upper layers that are equal to or higher than the transport layer and detects the reception of the wireless function update information including a program and/or data that define the update process for updating the function of the wireless processing unit when header information of the Internet Protocol (IP) packet corresponds to a predetermined pattern that has been previously stored, and an update processing unit of the wireless processing unit assembles a plurality of the Internet Protocol (IP) packets of which reception of wireless function update information has been detected by the update detecting unit to generate the wireless function update information and performs the update process based on the generated wireless function update information to update the function of the wireless processing unit.

8. The computer readable storage medium according to claim 7, wherein in execution of the update process, the updating includes deactivating the function of the wireless processing unit, and transmitting a deactivate request for deactivation of a function of the application processing unit to the application processing unit, and then updating the function of the wireless processing unit by performing the update process after the function of the application processing unit is deactivated.

9. The computer readable storage medium according to claim 7, wherein the detecting and the updating are executed by a layer-2 processing unit that implements a packet data convergence protocol.

* * * * *